US012681178B2

(12) United States Patent
Hiller et al.

(10) Patent No.: US 12,681,178 B2
(45) Date of Patent: Jul. 14, 2026

(54) OPTICAL DUAL FREQUENCY SHIFT LASER VEHICLE SPEED DETECTION SYSTEM

(71) Applicant: The Boeing Company, Chicago, IL (US)

(72) Inventors: Nathan D. Hiller, Irvine, CA (US); Robert M. Dowgwillo, St. Louis, MO (US); Ishaan Bakhle, Lynnwood, WA (US); Christopher Shoemaker, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 906 days.

(21) Appl. No.: 18/056,143

(22) Filed: Nov. 16, 2022

(65) Prior Publication Data
US 2024/0159907 A1 May 16, 2024

(51) Int. Cl.
*G01S 17/58* (2006.01)
(52) U.S. Cl.
CPC .................................... *G01S 17/58* (2013.01)
(58) Field of Classification Search
CPC ...... G01S 15/78; G01S 7/4808; G01S 7/4915;
G01S 13/58; G01S 17/10; G01S 17/32;
G01S 17/36; G01S 17/931; G01S 7/486;
G01P 13/025; G01P 3/50; G01P 21/02;
G01P 1/026; G01P 3/486; G01P 3/366;
G01P 3/36; G01P 3/68; G01P 3/806
See application file for complete search history.

(56) References Cited

U.S. PATENT DOCUMENTS

| | | | |
|---|---|---|---|
| 5,160,976 A | 11/1992 | Carr et al. | |
| 2004/0036873 A1 | 2/2004 | Dam-Hansen et al. | |
| 2021/0161408 A1 | 6/2021 | Wakita | |
| 2024/0402314 A1 * | 12/2024 | Nakamura | G01S 7/4815 |

FOREIGN PATENT DOCUMENTS

| | | | | |
|---|---|---|---|---|
| EP | 2108962 A2 * | 10/2009 | | G01S 7/4916 |

OTHER PUBLICATIONS

Lawrence et al., "Optical Radar Studies of the Atmosphere," NASA Langley Research Center, Fifth Symposium on Remote Sensing of Environment, Jan. 1, 1968, 9 pages.
Post et al., "Observations of Pinatubo ejecta over Boulder, Colorado by lidars of three different wavelengths," Geophysical Research Letters, Jan. 24, 1992, vol. 19, No. 2, pp. 195-198.
Vaughan, "Remote optical sensing by laser," Handbook of Opto-electronics—Second Edition, CRC Press, 2017, pp. 431-504.

(Continued)

*Primary Examiner* — Sanjiv D. Patel
(74) *Attorney, Agent, or Firm* — Yee & Associates, P.C.

(57) ABSTRACT

A method, apparatus, and system detect a speed of a vehicle. Laser beams are emitted into an atmosphere from the vehicle. The laser beams are emitted in different directions from the vehicle. Sets of backscatter light are generated in response to transmitting the laser beams into the atmosphere from the vehicle. The sets of backscatter light have frequency shifts relative to the frequency of the laser beams. A set of beat frequencies from interfering the sets of backscatter light with each other is measure. The speed of the vehicle is determined using the set of beat frequencies.

31 Claims, 21 Drawing Sheets

(56) References Cited

OTHER PUBLICATIONS

Zalach et al., "A Method for Retrieving Stratospheric Aerosol Extinction and Particle Size from Ground-Based Rayleigh-Mie-Raman Lidar Observations," MDPI, Atmosphere, Jul. 22, 2020, vol. 11, No. 8, 18 pages.
European Patent Office Extended Search Report, dated Mar. 19, 2024, regarding Application No. EP23206721.5, 10 pages.
Mocker H W et al: "Laser Doppler Optical Air-Data System: Feasibility Demonstration and Systems Specifications", Applied Optics, Optical Society of America, Washington, Dc, US, vol. 33, No. 27, Sep. 20, 1994 (Sep. 20, 1994), pp. 6457-6471, XP000469295, Issn: 0003-6935, DOI: 10.1364/AO.33.006457.

* cited by examiner

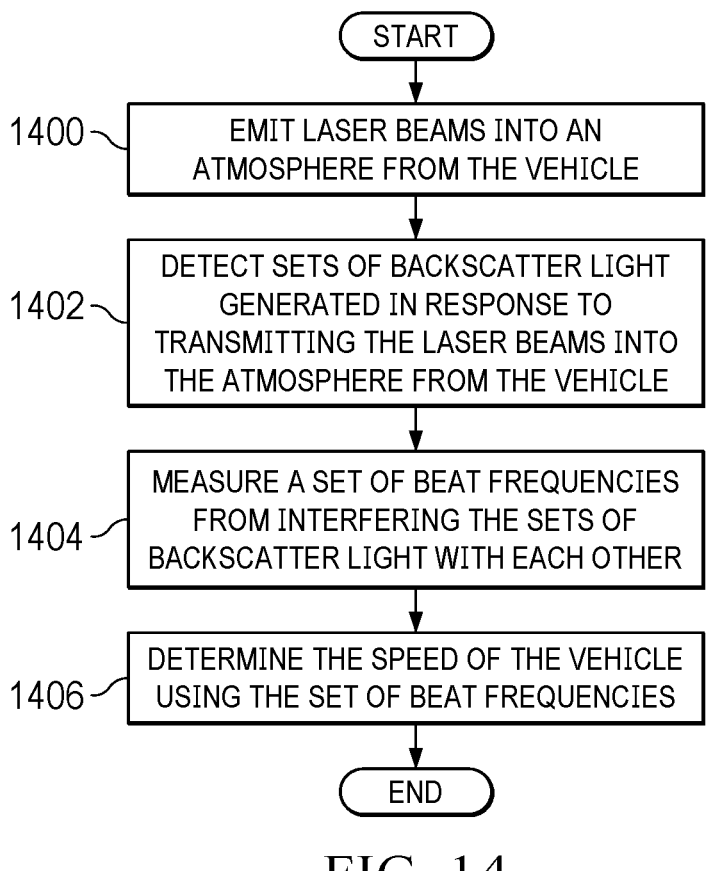

START

1400 — EMIT LASER BEAMS INTO AN ATMOSPHERE FROM THE VEHICLE

1402 — DETECT SETS OF BACKSCATTER LIGHT GENERATED IN RESPONSE TO TRANSMITTING THE LASER BEAMS INTO THE ATMOSPHERE FROM THE VEHICLE

1404 — MEASURE A SET OF BEAT FREQUENCIES FROM INTERFERING THE SETS OF BACKSCATTER LIGHT WITH EACH OTHER

1406 — DETERMINE THE SPEED OF THE VEHICLE USING THE SET OF BEAT FREQUENCIES

END

FIG. 14

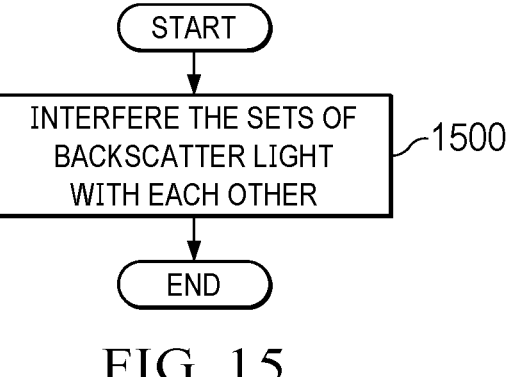

START

INTERFERE THE SETS OF BACKSCATTER LIGHT WITH EACH OTHER — 1500

END

FIG. 15

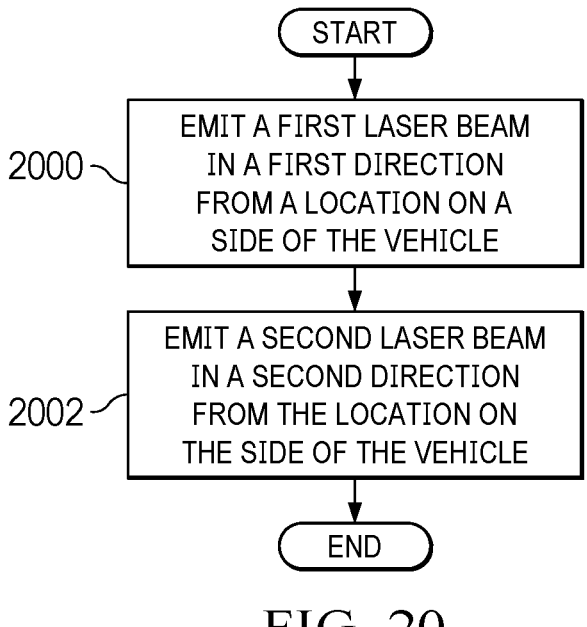

START

2000 → EMIT A FIRST LASER BEAM
IN A FIRST DIRECTION
FROM A LOCATION ON A
SIDE OF THE VEHICLE

2002 → EMIT A SECOND LASER BEAM
IN A SECOND DIRECTION
FROM THE LOCATION ON
THE SIDE OF THE VEHICLE

END

FIG. 20

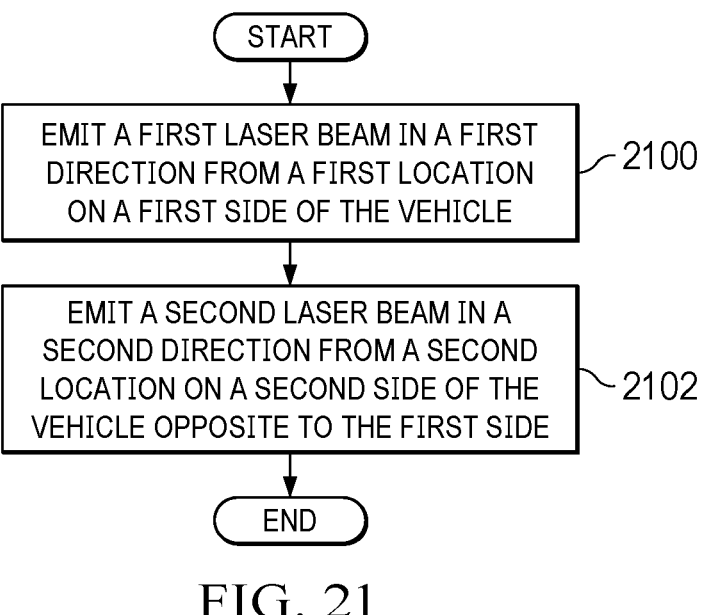

START

EMIT A FIRST LASER BEAM IN A FIRST
DIRECTION FROM A FIRST LOCATION
ON A FIRST SIDE OF THE VEHICLE → 2100

EMIT A SECOND LASER BEAM IN A
SECOND DIRECTION FROM A SECOND
LOCATION ON A SECOND SIDE OF THE
VEHICLE OPPOSITE TO THE FIRST SIDE → 2102

END

FIG. 21

START

2200 — EMIT A FIRST LASER BEAM IN A FIRST DIRECTION AT A FOCAL POINT FROM A FIRST LOCATION ON A SIDE OF THE VEHICLE

2202 — EMIT A SECOND LASER BEAM IN A SECOND DIRECTION AT THE FOCAL POINT FROM A SECOND LOCATION OF ON THE SIDE

END

START

INTERFERE A FIRST BACKSCATTER LIGHT WITH A SECOND BACKSCATTER LIGHT — 2300

END

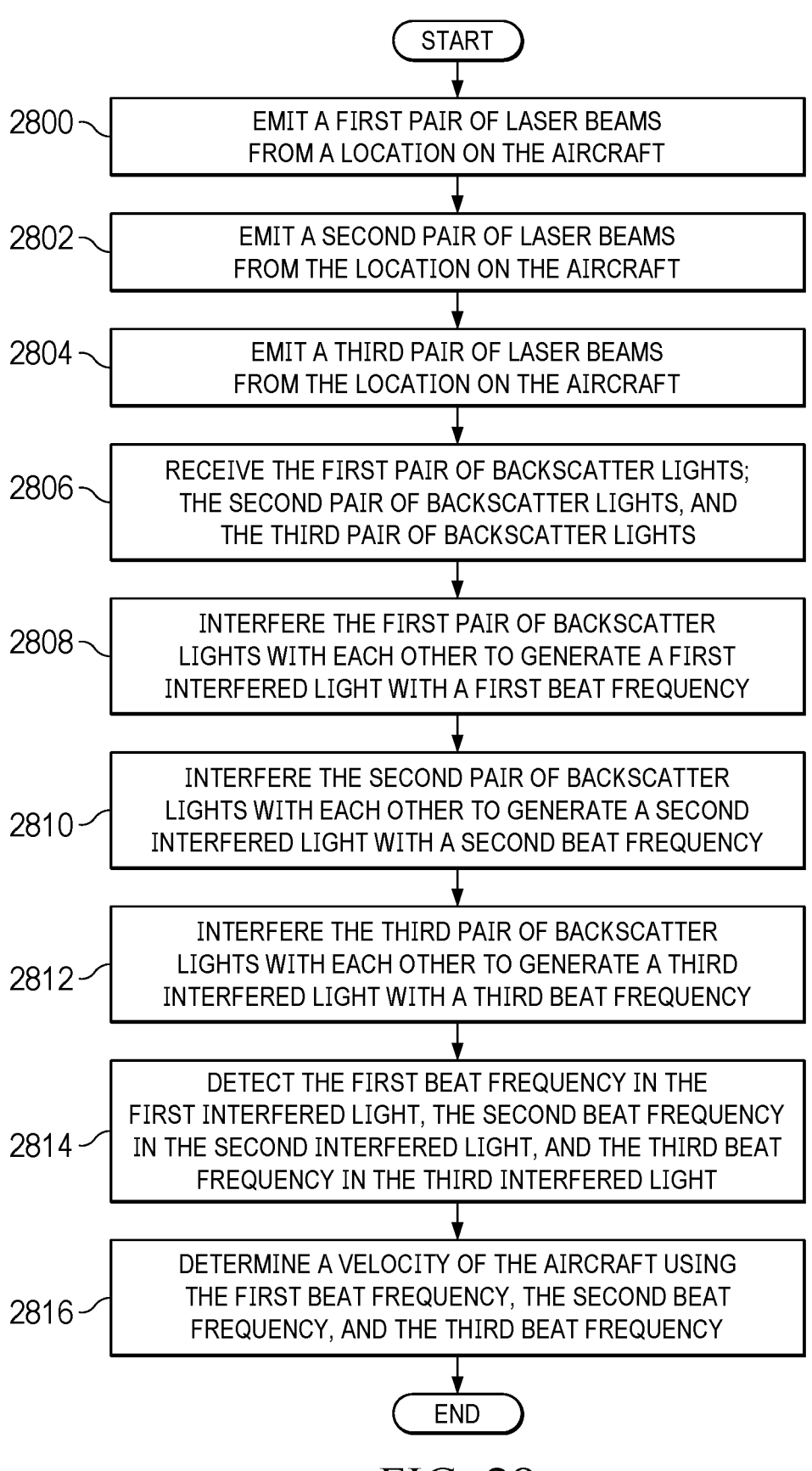

START

2800 — EMIT A FIRST PAIR OF LASER BEAMS FROM A LOCATION ON THE AIRCRAFT

2802 — EMIT A SECOND PAIR OF LASER BEAMS FROM THE LOCATION ON THE AIRCRAFT

2804 — EMIT A THIRD PAIR OF LASER BEAMS FROM THE LOCATION ON THE AIRCRAFT

2806 — RECEIVE THE FIRST PAIR OF BACKSCATTER LIGHTS; THE SECOND PAIR OF BACKSCATTER LIGHTS, AND THE THIRD PAIR OF BACKSCATTER LIGHTS

2808 — INTERFERE THE FIRST PAIR OF BACKSCATTER LIGHTS WITH EACH OTHER TO GENERATE A FIRST INTERFERED LIGHT WITH A FIRST BEAT FREQUENCY

2810 — INTERFERE THE SECOND PAIR OF BACKSCATTER LIGHTS WITH EACH OTHER TO GENERATE A SECOND INTERFERED LIGHT WITH A SECOND BEAT FREQUENCY

2812 — INTERFERE THE THIRD PAIR OF BACKSCATTER LIGHTS WITH EACH OTHER TO GENERATE A THIRD INTERFERED LIGHT WITH A THIRD BEAT FREQUENCY

2814 — DETECT THE FIRST BEAT FREQUENCY IN THE FIRST INTERFERED LIGHT, THE SECOND BEAT FREQUENCY IN THE SECOND INTERFERED LIGHT, AND THE THIRD BEAT FREQUENCY IN THE THIRD INTERFERED LIGHT

2816 — DETERMINE A VELOCITY OF THE AIRCRAFT USING THE FIRST BEAT FREQUENCY, THE SECOND BEAT FREQUENCY, AND THE THIRD BEAT FREQUENCY

END

| 3002 | SPECIFICATION AND DESIGN |
| 3004 | MATERIAL PROCUREMENT |
| 3006 | COMPONENT AND SUBASSEMBLY MANUFACTURING |
| 3008 | SYSTEM INTEGRATION |
| 3010 | CERTIFICATION AND DELIVERY |
| 3012 | IN SERVICE |
| 3014 | MAINTENANCE AND SERVICE |

3100

AIRCRAFT

3102 — AIRFRAME     INTERIOR —3106

SYSTEMS

PROPULSION SYSTEM     ELECTRICAL SYSTEM 3108   3112     3110   3114

3104 —

HYDRAULIC SYSTEM     ENVIRONMENTAL SYSTEM

OPTICAL DUAL FREQUENCY SHIFT LASER VEHICLE SPEED DETECTION SYSTEM

BACKGROUND INFORMATION

1. Field

The present disclosure relates generally to sensors and in particular, to a method, apparatus, and system for detecting a speed of a moving vehicle.

2. Background

A sensor such as a pitot tube is used to detect the speed of an aircraft. However, this type of sensor protrudes from the surface of aircraft to place the pitot tube into the airflow. This protrusion makes this type of sensor susceptible to environmental conditions. For example, unintended impacts, such as bird or insect strikes, can occur on a pitot tube. Other environmental issues include ice formation on the pitot tube.

Another type of sensor used for detecting airspeed is a light detection and ranging (LIDAR) sensor. With a LIDAR sensor, a laser beam is transmitted into the air and backscatter generated in response to the laser beam is detected. The airspeed of the aircraft can be determined by comparing the frequency of the laser beam to the frequency in the backscatter. This shift in frequency can be used to calculate the speed of the aircraft.

SUMMARY

An embodiment of the present disclosure provides a method for detecting a speed of a vehicle. Laser beams are emitted into an atmosphere from the vehicle. The laser beams are emitted in different directions from the vehicle. Sets of backscatter light are generated in response to transmitting the laser beams into the atmosphere from the vehicle. The sets of backscatter light have frequency shifts relative to the frequency of the laser beams. A set of beat frequencies from interfering the sets of backscatter light with each other is measured. The speed of the vehicle is determined using the set of beat frequencies.

Another embodiment of the present disclosure provides a method for detecting a speed of an aircraft. A first laser beam and a second laser beam are emitted in different directions into an atmosphere from the aircraft. A first backscatter light and a second backscatter light are detected. The first backscatter light having a positive frequency shift is generated in response to emitting the first laser beam and a second backscatter light having a negative frequency shift is generated in response to emitting the second laser beam. The first backscatter light is interfered with the second backscatter light. An interfered light having a beat frequency is generated. The beat frequency is measured and the speed of the aircraft is determined using the beat frequency.

In yet another embodiment of the present disclosure, a method is provided for detecting a speed of an aircraft. A first pair of laser beams is emitted from a location on the aircraft. The first pair of laser beams is emitted at a first pair of focal points that results in a first pair of backscatter lights having first opposite frequency shifts. A second pair of laser beams is emitted from the location on the aircraft. The second pair of laser beams is emitted at a second pair of focal points that results in a second pair of backscatter lights having second opposite frequency shifts. A third pair of laser beams is emitted from the location on the aircraft. The third pair of laser beams is emitted at a third pair of focal points that results in a third pair of backscatter lights having third opposite frequency shifts. The first pair of backscatter lights is received; the second pair of backscatter lights is received; and the third pair of backscatter lights is received. The first pair of backscatter lights is interfered with each other to generate a first interfered light with a first beat frequency; the second pair of backscatter lights is interfered with each other to generate a second interfered light with a second beat frequency; and the third pair of backscatter lights is interfered with each other to generate a third interfered light with a third beat frequency. The first beat frequency in the first interfered light is detected; the second beat frequency in the second interfered light is detected; and the third beat frequency in the third interfered light is detected. A velocity of the aircraft is determined using the first beat frequency, the second beat frequency, the third beat frequency.

In still another embodiment of the present disclosure, a speed detection system comprises a laser beam generator, interference system, a detection system, and a speed analyzer. The laser beam generator is configured to emit laser beams into an atmosphere from a vehicle. The laser beams are emitted in different directions from the vehicle. The interference system is configured to interfere sets of backscatter light with each other. A set of interfered lights having the set of beat frequencies is generated. The detection system is configured to measure the set of beat frequencies in the set of interfered lights. The speed analyzer is configured to determine a speed for the vehicle using the set of beat frequencies.

In yet another embodiment of the present disclosure, a speed detection system comprises a laser beam generator, an interference system, a detection system, and a speed analyzer configured. The laser beam generator is configured to emit laser beams into an atmosphere from a vehicle. The laser beams are emitted in different directions from the vehicle. The interference system is configured to interfere sets of backscatter light with each other. A set of interfered lights having a set of beat frequencies is generated. The detection system is configured to measure the set of beat frequencies in the set of interfered lights. The speed analyzer is configured to monitor the set of beat frequencies received from the detection system. The speed analyzer is configured to monitor the set of beat frequencies received from the detection system to indicate that at least one of the interference system or the detection system is operating out of tolerance in response a beat frequency in the set of beat frequencies being zero and in response to a presence of a condition in which beat frequency is expected to be non-zero.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 14 is an illustration of a flowchart of a process for determining speed for a vehicle in accordance with an illustrative embodiment;

FIG. 15 is an illustration of a flowchart of a process for interfering backscatter light in accordance with an illustrative embodiment;

FIG. 20 is an illustration of a flowchart of a process for emitting laser beams into an atmosphere from a location on a side of a vehicle in accordance with an illustrative embodiment;

FIG. 21 is an illustration of a flowchart of a process for emitting laser beams into an atmosphere from locations on different sides of a vehicle in accordance with an illustrative embodiment;

FIG. 28 is an illustration of a flowchart of a process for detecting a speed of an aircraft in accordance with an illustrative embodiment;

DETAILED DESCRIPTION

The illustrative embodiments recognize and take into account one or more different considerations as described herein. For example, the illustrative embodiments recognize and take into account that when using a laser beam to detect speed, the aircraft transmits a laser beam and compares that transmitted light to light received in response to transmission of the laser beam. Aircraft transmits the laser beam into the air which encounters airborne particles. For example, with a coherent LIDAR system, a small fraction of laser beam is scattered by ice crystals, dust, and other particles. This scattering results in a shift in frequency. Some of the scattered light reaches the aircraft and is detected as backscatter.

However, at different altitudes different amounts of particles may be present. For example, at lower elevations, plenty of particles are present to scatter a laser beam. This lower elevation can be, for example, 20,000 feet to 30,000 feet. As result, the backscatter detected at this lower elevation is greater than at a mid-elevation. The mid-elevation elevation can be, for example, 30,000 feet to 40,000 feet. At a mid-elevation, fewer particles are present to scatter the laser beam. As a result, a weaker backscatter is detected by the aircraft. At a high elevation above mid-elevation, plenty of particles are present resulting in a stronger backscatter being detected as compared to the mid-elevation. As a result, at mid-altitudes, the power of the backscatter light detected can be low enough to reduce performance in detecting the speed of the aircraft.

Thus, the illustrative embodiments provide a method, apparatus, and system that detects a speed of a vehicle. In one illustrative example, laser beams are emitted into the atmosphere from the vehicle. The laser beams are emitted in different directions from the vehicle. Sets of backscatter light are generated in response to transmitting the laser beams into the atmosphere from the vehicle. The sets of backscatter light have frequency shifts relative to the frequency of the laser beams. A set of beat frequencies from interfering the sets of backscatter light with each other is measured. The speed of the vehicle is determined using the set of beat frequencies.

Figure 1:
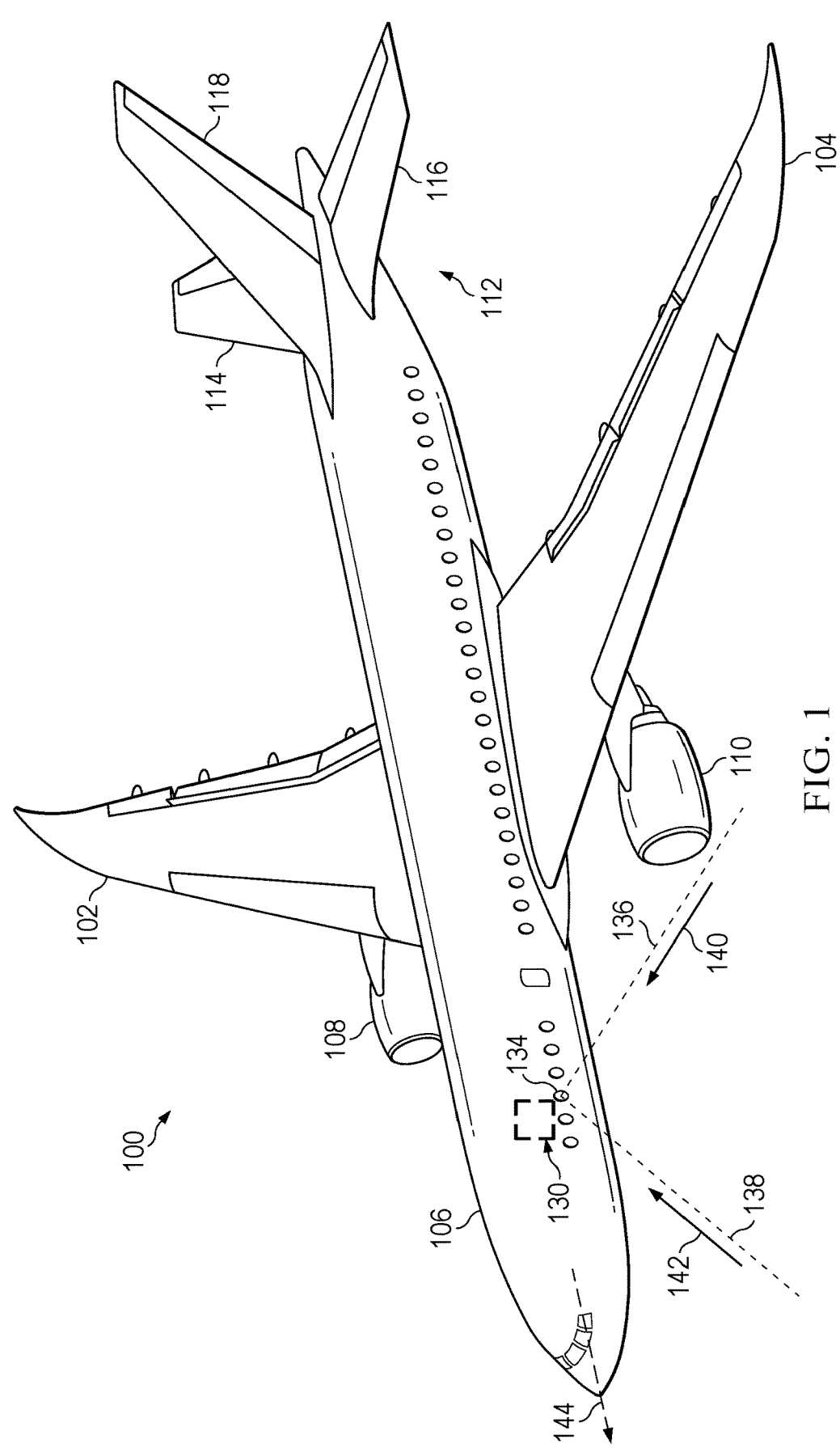
FIG. 1 is an illustration of an aircraft is depicted in accordance with an illustrative embodiment.

With reference now to the figures, and in particular, with reference to FIG. 1, an illustration of an aircraft is depicted in accordance with an illustrative embodiment. In this illustrative example, commercial airplane 100 has wing 102 and wing 104 attached to body 106. Commercial airplane 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Commercial airplane 100 is an example of an aircraft in which speed detection system 130 can be implemented in accordance with an illustrative embodiment. In this illustrative example, speed detection system 130 can operate to emit laser beams from window 134 during flight or other movement of commercial airplane 100. Speed detection system 130 can detect backscatter light generated in response to emitting these laser beams.

In this depicted example, speed detection system 130 emits first laser beam 136 and second laser beam 138 from window 134 in different directions. These two laser beams are emitted using the same frequency in this example.

First backscatter light 140 is generated in response to emitting first laser beam 136, and second backscatter light 142 is generated in response to emitting second laser beam 138. In this example, first backscatter light 140 and second backscatter light 142 are detected by speed detection system 130. In this depicted example, first backscatter light 140 and second backscatter light 142 are used to determine the speed of commercial airplane 100.

Greater frequency shifts between first backscatter light 140 and second backscatter light 142 can occur by emitting first laser beam 136 and second laser beam 138 in different directions. In this example, first laser beam 136 is emitted in movement direction 144 of commercial airplane 100. As depicted, second laser beam 138 is emitted in an opposite direction to movement direction 144 of commercial airplane 100. In this illustrative example, both first laser beam 136 and second laser beam 138 have the same frequency when emitted from window 134 of commercial airplane 100.

First backscatter light 140 has a frequency shift in which the frequency of backscatter light increases with respect to the frequency of first laser beam 136. In this example, second backscatter light 142 has a frequency shift in which the frequency of backscatter light decreases with respect to the frequency of second laser beam 138.

Depending on the direction in which first laser beam 136 is emitted in direction of movement direction 144 and the direction in which second laser beam 138 is emitted in the opposite direction of movement direction 144, the frequency shifts of the backscatter light detected in response to these two laser beams with reference to the frequency of the laser beams can be double the frequency shift from just one of these laser beams.

In this illustration of commercial airplane 100 with speed detection system 130 is presented to describe some features of the illustrative examples in which backscatter light received from two or more laser beams can be used to determine the speed of commercial airplane 100. This illustration is not meant to limit the manner in which other illustrative examples can be implemented.

For example, in other illustrative examples other numbers of laser beams can be emitted from window 134. Further, these laser beams can be emitted from other locations in addition or in place of window 134. For example, laser beams can be emitted from the nose and tail of commercial airplane 100 in other examples. In yet other illustrative examples, laser beams can be emitted from the other side of commercial airplane 100. In still other illustrative examples, one or more laser beams can be emitted from the top or bottom side of commercial airplane 100.

Figure 2:
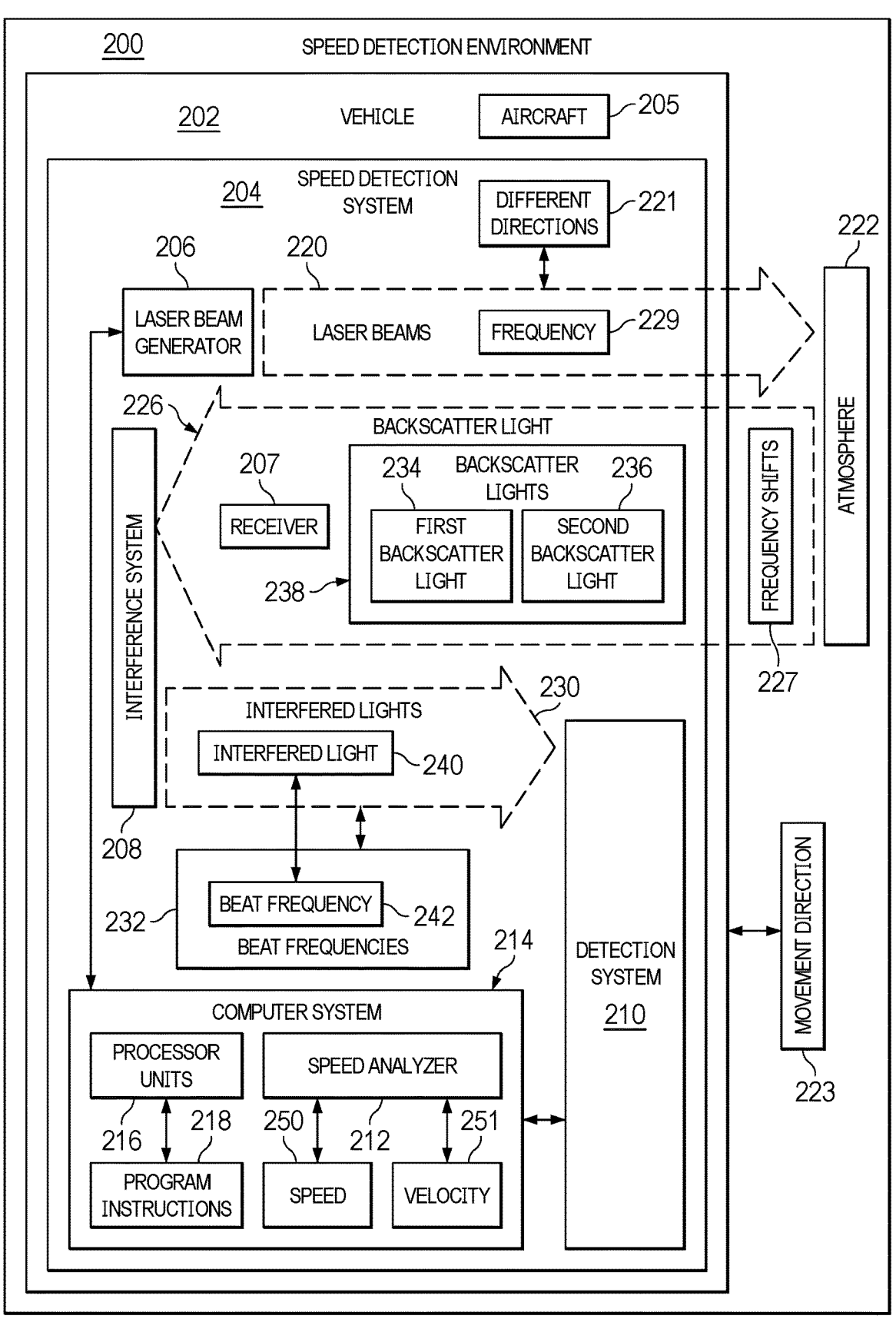
FIG. 2 is an illustration of a block diagram of a speed detection environment in accordance with an illustrative embodiment.

With reference now to FIG. 2, an illustration of a block diagram of a speed detection environment is depicted in accordance with an illustrative embodiment. In this illustrative example, speed detection environment 200 is an environment in which the speed for vehicle 202 can be detected using speed detection system 204. In this example, vehicle 202 can take the form of aircraft 205. Commercial airplane 100 in FIG. 1 is an example of one implementation for aircraft 205. Vehicle 202 can be selected from a group comprising a mobile platform, aircraft, a commercial airplane, a cargo airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, an automobile, a motorcycle, and other suitable vehicles.

In this illustrative example, speed detection system 204 comprises a number of different components. As depicted, speed detection system 204 comprises laser beam generator 206, receiver 207, interference system 208, detection system 210, and speed analyzer 212. With the use of laser beam generator 206 to generate laser beams 220, speed detection system 204 can be a LIDAR system. In this illustrative example, speed analyzer 212 can control laser beam generator 206 to generate laser beams 220.

In the illustrative example, laser beams 220 have the same characteristics. In other words, each laser beam in laser beams 220 can have the same frequency, power, and other characteristics. In another illustrative example, sets of laser beams 220 can have the same characteristics. For example, a first laser beam and a second laser beam in a set of laser beams 220 can have the same frequency, power, and other characteristics.

Speed analyzer 212 can be implemented in software, hardware, firmware or a combination thereof. When software is used, the operations performed by speed analyzer 212 can be implemented in program instructions configured to run on hardware, such as a processor unit. When firmware is used, the operations performed by speed analyzer 212 can be implemented in program instructions and data and stored in persistent memory to run on a processor unit. When hardware is employed, the hardware may include circuits that operate to perform the operations in speed analyzer 212.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In this illustrative example, speed analyzer 212 can be located in computer system 214. Computer system 214 is a physical hardware system and includes one or more data processing systems. When more than one data processing system is present in computer system 214, those data processing systems are in communication with each other using a communications medium. The communications medium may be a network. The data processing systems may be selected from at least one of a computer, a server computer, a tablet, or some other suitable data processing system.

As depicted, computer system 214 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. When the number of processor units 216 execute program instructions 218 for a process, the number of processor units 216 can be one or more processor units that are on the same computer or on different computers. In other words, the process can be distributed between processor units 216 on the same or different computers in a computer system 214. Further, the number of processor units 216 can be of the same type or different type of processor units. For example, a number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In the illustrative example, speed analyzer 212 can control laser beam generator 206 to emit laser beams 220 into atmosphere 222 from vehicle 202. In this illustrative example, laser beams 220 are emitted in different directions 221 from vehicle 202. As depicted, different directions 221 are with respect to movement direction 223 of the movement of vehicle 202.

In this illustrative example, receiver 207 receives the sets of backscatter light 226 generated in response to emitting laser beams 220 into atmosphere 222 from vehicle 202. The sets of backscatter light 226 have frequency shifts 227 relative to frequency 229 of the laser beams 220.

As depicted, interference system 208 interferes the sets of backscatter light 226 with each other. In this example, the interfering of the sets of backscatter light 226 by interference system 208 results in a set of interfered lights 230 that comprise a set of beat frequencies 232 being generated. In one illustrative example, this interfering the set of backscatter light 226 comprises interfering a set of backscatter lights in the set of backscatter lights with each other to generate an interfered light.

For example, interference system 208 interferes first backscatter light 234 and second backscatter light 236 in a set of backscatter lights 238 with each other to generate interfered light 240 in the set of interfered lights 230. This interfered light generated from the two backscatter lights has beat frequency 242.

As depicted, detection system 210 measures a set of beat frequencies 232 from interfering the sets of backscatter light 226 with each other. For example, beat frequency 242 in the set of beat frequencies 232 is measured for interfered light 240. The beat frequency is between first backscatter light 234 and second backscatter light 236 in the set of backscatter lights 238 in the sets of backscatter light 226.

Speed analyzer 212 determines speed 250 of vehicle 202 using the set of beat frequencies 232. In one illustrative example, speed analyzer 212 can determine velocity 251. Velocity 251 is speed 250 and a vector describing the direction of movement of vehicle 202. Velocity 251 can be determined when three or more pairs of laser beams 220 are emitted to generate a response in which three or more pairs of backscatter light 226 are received in the response.

Figure 3:
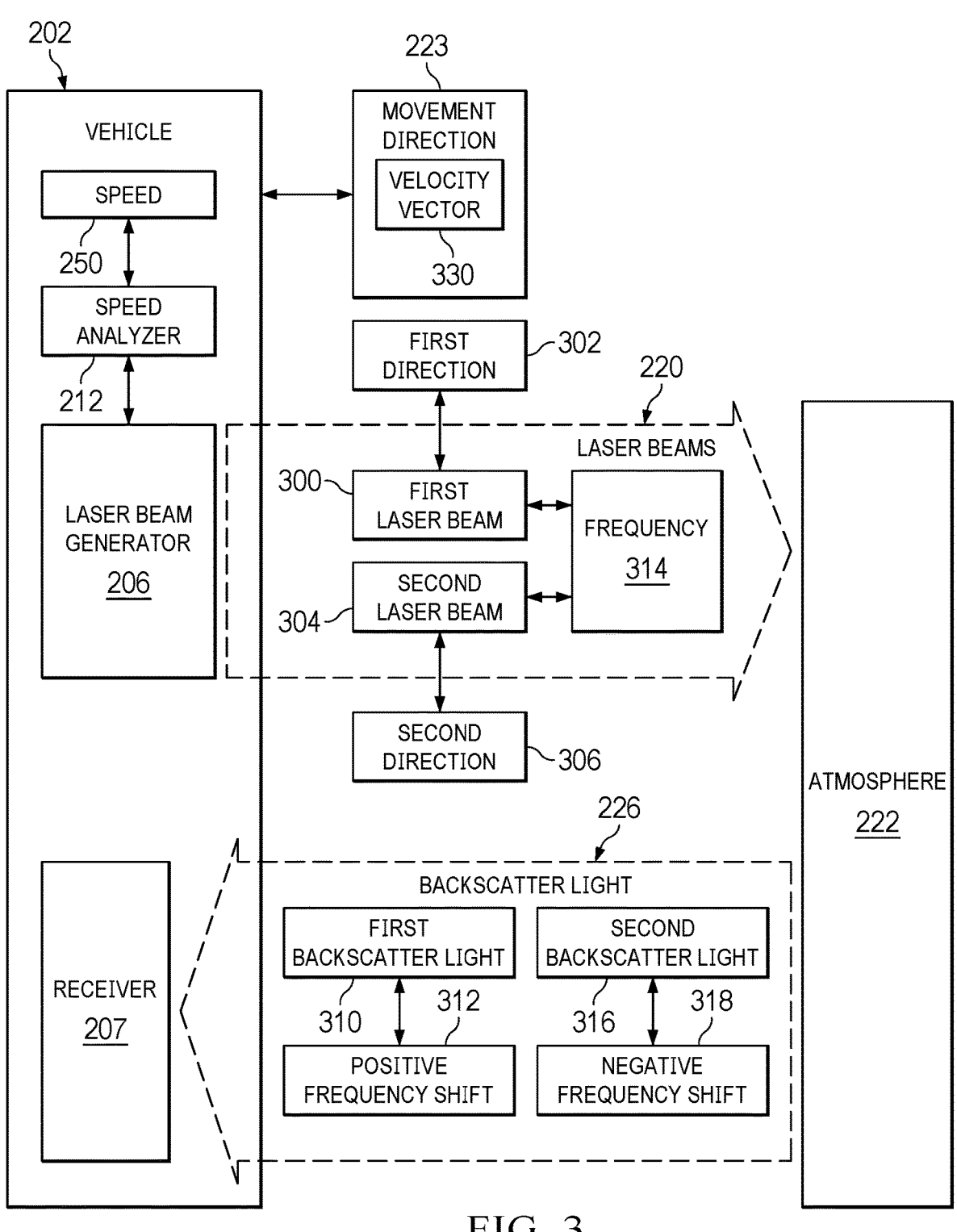
FIG. 3 is an illustration of a block diagram of laser beam emission and backscatter light generation in accordance with an illustrative embodiment.

With reference next to FIG. 3, an illustration of a block diagram of laser beam emission and backscatter light generation is depicted in accordance with an illustrative embodiment. In the illustrative examples, the same reference numeral may be used in more than one figure. This reuse of a reference numeral in different figures represents the same element in the different figures.

In this illustrative example, speed analyzer 212 can control the manner in which laser beam generator 206 emits laser beams 220. In this example, laser beam generator 206 emits first laser beam 300 in laser beams 220 in first direction 302. Laser beam generator 206 also emits second laser beam 304 in laser beams 220 in second direction 306.

In this depicted example, backscatter light 226 is generated in response to emitting these laser beams. As depicted, backscatter light 226 comprises first backscatter light 310 having a positive frequency shift 312 from frequency 314 of first laser beam 300 in response to laser beam generator 206 emitting first laser beam 300 into atmosphere 222.

In this illustrative example, positive frequency shift 312 means that the frequency of first backscatter light 310 increases relative to frequency 314 of first laser beam 300. Negative frequency shift 318 means that the frequency of second backscatter light 316 decreases relative to frequency 314 of second laser beam 304.

Further, in this example, the sets of backscatter light 226 detected by receiver 207 comprises second backscatter light 316 having a negative frequency shift 318 from frequency 314 of first laser beam 300 in response to laser beam generator 206 emitting second laser beam 304 into atmosphere 222.

In this illustrative example, first direction 302 of first laser beam 300 is in movement direction 223 of a movement of vehicle 202. Further in this example, second direction 306 is an opposite direction to the movement direction 223 of the movement of vehicle 202. Depending on the vector for first direction 302 the vector for second direction 306 and the vector of the movement direction for vehicle 202, positive frequency shift 312 and negative frequency shift 318 can vary. Positive frequency shift 312 and negative frequency shift 318 can result in a double frequency shift with respect to frequency 314 of first laser beam 300 and second laser beam 304.

In the different examples, the manner in which these laser beams are emitted results in the frequency shifts that are greater than would be obtained between the frequencies for a laser beam and the backscatter light received in response to the laser beam. Thus, the illustrative example increases the accuracy in determining speed for vehicle 202.

In one illustrative example, movement direction 223 can be described by velocity vector 330. In one example, velocity vector 330 can comprise X, Y, and Z components for movement direction 223. In this example, first laser beam 300 in laser beams 220 can be emitted in a direction of velocity vector 330 for movement of vehicle 202. In this example, second laser beam 304 in laser beams 220 can be emitted in an opposite direction to velocity vector 330 for movement of vehicle 202.

The emission of a laser beam with respect to velocity vector 330 can be with respect to at least one of the components of velocity vector 330. In one illustrative example, velocity vector 330 can be described using a Cartesian coordinate system using X, Y, and Z values.

For example, if the Y components of the velocity vector describes upward and downward movement of aircraft 205, this direction with respect to velocity vector 330 can be described using positive and negative Y values. One laser can be directed upwards with a positive Y value and another laser can be directed downwards with a negative value Y.

For example, if aircraft 205 moves downwards such that the Y value of velocity vector 330 is a negative Y value, emitting first laser beam 300 in first direction 302 having a negative Y value results in positive frequency shift 312 for first backscatter light 310. In this example, emitting second laser beam 304 in second direction 306 that is upward and has a positive Y value results in a negative frequency shift 318 for second backscatter light 316.

Further, these laser beams directed with respect to the Y components of velocity vector 330 do not need to have similar positive and negative values for Y and Z components. In other illustrative examples, the direction of the laser can be described with respect to two components such as, for example, X and Z values in velocity vector 330.

As a result, increased frequency shifts can be obtained for different components of velocity vector 330 by directing two laser beams in opposite directions with respect to one or more components of velocity vector 330. The increased frequency shifts through directing a pair of laser beams, such as first laser beam 300 and second laser beam 304, makes it easier to determine speed 250 as compared to a lower frequency shift obtained using the backscatter from a single laser beam and comparing the backscatter to a reference light for the laser beam.

Figure 4:
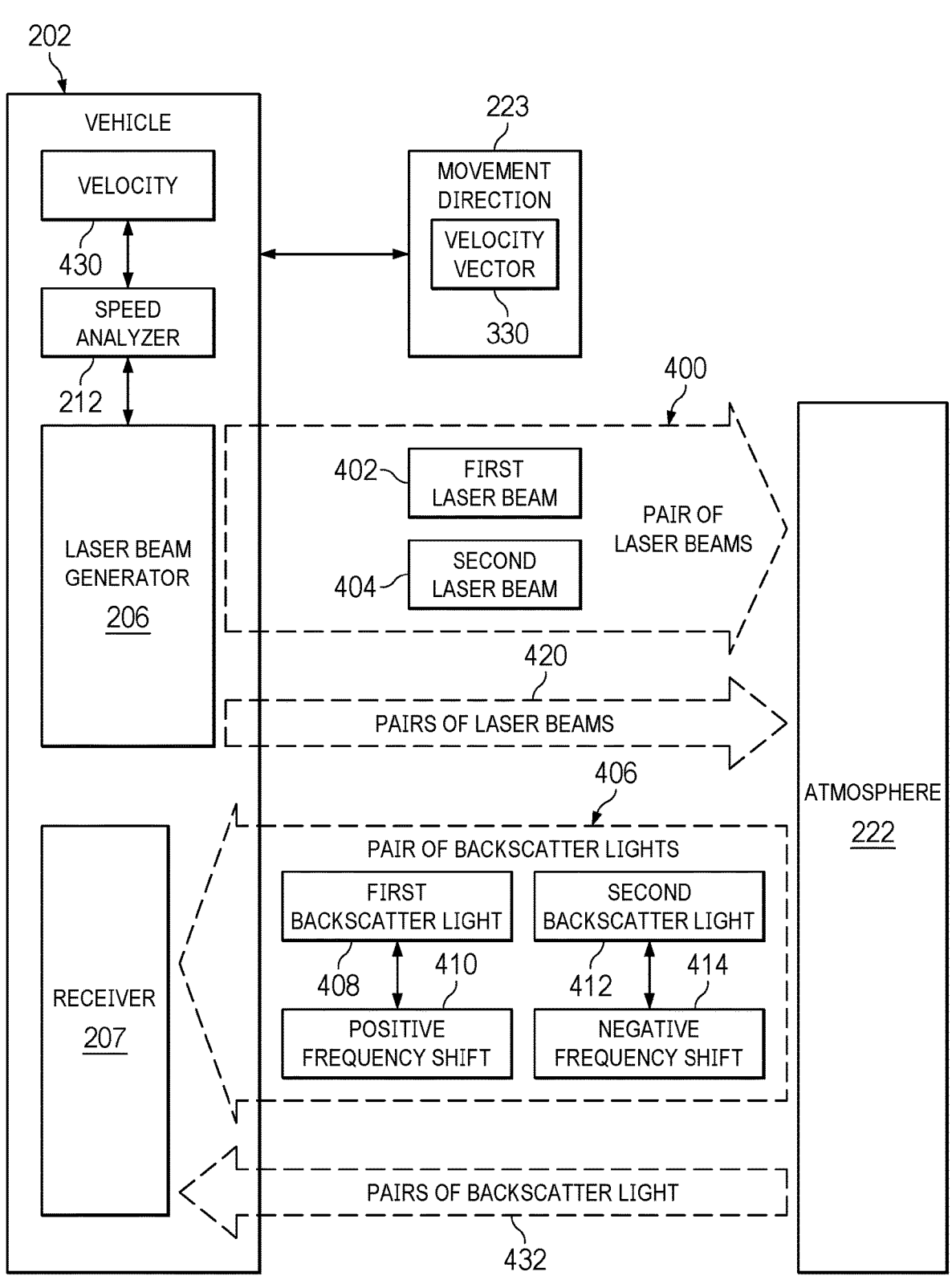
FIG. 4 is an illustration of a block diagram of laser beam emission and backscatter light generation in accordance with an illustrative embodiment.

Turning next to FIG. 4, an illustration of a block diagram of laser beam emission and backscatter light generation is depicted in accordance with an illustrative embodiment. In this illustrative example, speed analyzer 212 can control laser beam generator 206 to emit laser beams 220.

In this illustrative example, speed analyzer 212 controls laser beam generator 206 to emit laser beams as pair of laser beams 400. With this example, first laser beam 402 and second laser beam 404 in pair of laser beams 400 are directed at opposite directions relative to velocity vector 330 for a movement of vehicle 202.

With this example, pair of backscatter lights 406 is generated in response to pair of laser beams 400, in which first backscatter light 408 in pair of backscatter lights 406 has positive frequency shift 410 and second backscatter light 412 in pair of backscatter lights 406 has negative frequency shift 414.

In this illustrative example, laser beam generator 206 can also emit pairs of laser beams 420 in different directions such that speed analyzer 212 can determine velocity 430 of vehicle 202. In this example, three or more pairs of laser beams 420 can be pairs of backscatter light 432 with sufficient information to determine velocity 430 vehicle 202.

The illustration of speed detection environment 200 and the different components in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, speed analyzer 212 can also control the operation of interference system 208 when configurable components are present in interference system 208. For example, interference system 208 can include components to select which backscatter relates are to be interfered with each other.

As another example, speed analyzer 212 can also perform diagnostics for components in speed detection system 204. For example, speed analyzer 212 can be configured to monitor the set of beat frequencies 232 received from detection system 210. Speed analyzer 212 can indicate that at least one of interference system 208 or detection system 210 is operating out of tolerance in response a beat frequency in the set of beat frequencies 232 being zero and in response to a presence of a condition in which beat frequency is expected to be non-zero.

For example, the condition in which the beat frequency is expected to be non-zero can be vehicle 202 is moving and laser beam generator 206 in speed detection system 204 is emitting laser beams 220. The set of components can be selected from at least one of an optical fiber, an interference coupler, a circulator, a detector, or a telescope. Further diagnostics and testing can be performed to determine which components are operating out of tolerance.

Figure 5:
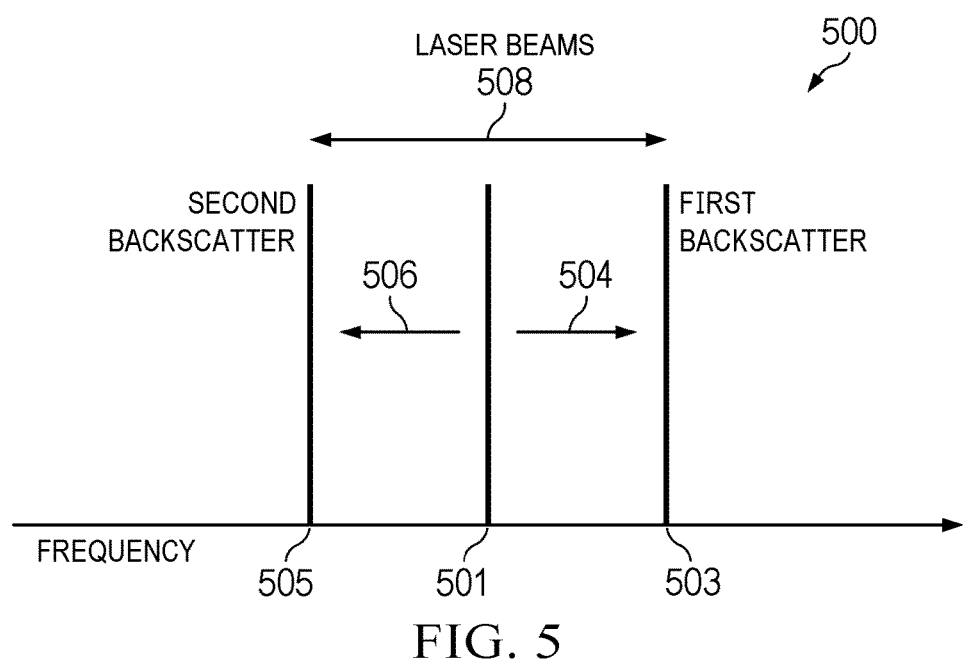
FIG. 5 is an illustration of frequency shifts in backscatter light in accordance with an illustrative embodiment.

With reference to FIG. 5, an illustration of frequency shifts in backscatter light is depicted in accordance with an illustrative embodiment. In this illustrative example, graph 500 depicts laser beam frequency 501 for two laser beams. Laser beam frequency 501 is the frequency at which the two laser beams are emitted from a vehicle. The laser beams can be emitted in different directions from the vehicle relative to the movement direction of the vehicle. Depending on the direction at which the laser beams are emitted, laser beam frequency 501 for the laser beams can change when the laser beams encounter particles in the atmosphere.

In this example, in response to emitting the laser beams, two sets of backscatter light can be received having frequency shifts. In these illustrative examples, an increase or decrease in frequency depends on the direction that the laser beam is emitted relative to the movement of the vehicle.

For example, if a first laser beam in the laser beams is emitted in the direction of movement of the vehicle, positive frequency shift 504 occurs for first backscatter light. The first backscatter light is generated in response to the first laser beam encountering particles that scatter the first laser beam while the vehicle moves towards the particles. This increase in frequency is positive frequency shift 504 as depicted by first backscatter frequency 503. As depicted, the increase in frequency is relative to laser beam frequency 501 for the first laser beam.

Further in this example, when a second laser beam in the two laser beams is directed away from the direction of movement of the vehicle, negative frequency shift 506 occurs in response to the second laser beam encountering particles in the atmosphere with the vehicle moving away from the particles to generate a second backscatter light. The frequency for this second backscatter light has second backscatter frequency 505, which is lower than laser beam frequency 501.

As a result, using the backscatter light from the two laser beams emitted in opposite directions relative to the movement of the vehicle can provide a greater difference in frequency as compared to using backscatter light from sending laser beams in the same direction relative to movement of the vehicle or using backscatter light from a single laser beam and the laser beam.

In this example, positive frequency shift 504 to first backscatter frequency 503 and negative frequency shift 506 to second backscatter frequency 505 increases the frequency difference between the first backscatter light and the second backscatter light. This increased frequency difference provides an improved better result when determining the speed of the vehicle using the beat frequency of an interfered light resulting from interfering the two backscatter lights with each other. In this illustrative example, the frequency difference can be a double shift 508 for the frequency difference between first backscatter frequency 503 and second backscatter frequency 505 relative to laser beam frequency 501.

Figure 6:
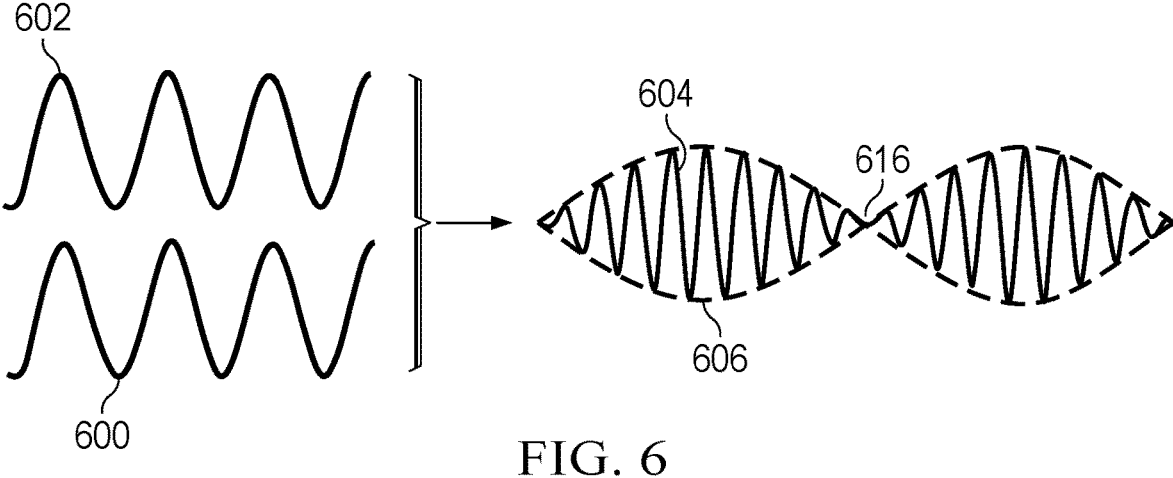
FIG. 6 is an illustration of light used to determine the speed of the vehicle in accordance with an illustrative embodiment.

Turning next to FIG. 6, an illustration of light used to determine the speed of the vehicle is depicted in accordance with an illustrative embodiment. In the illustrative example, a pair of backscatter lights is detected in response to emitting a pair of laser beams.

In this illustrative example, the pair of backscatter lights comprises first backscatter light 600 and second backscatter light 602, which are coherent light. In this example, a difference is present between the frequency for first backscatter light 600 and second backscatter light 602. This difference in frequency can be such that the interference of the first backscatter light 600 and second backscatter light 602 results in a beat frequency.

As depicted in this example, when first backscatter light 600 and second backscatter light 602 are interfered or combined with each other, interfered light 604 with beat frequency 606 is generated. In this example, beat frequency 606 can be measured by measuring the power of interfered light 604. Beat frequency 606 can be used to determine the speed of the vehicle.

Figure 7:
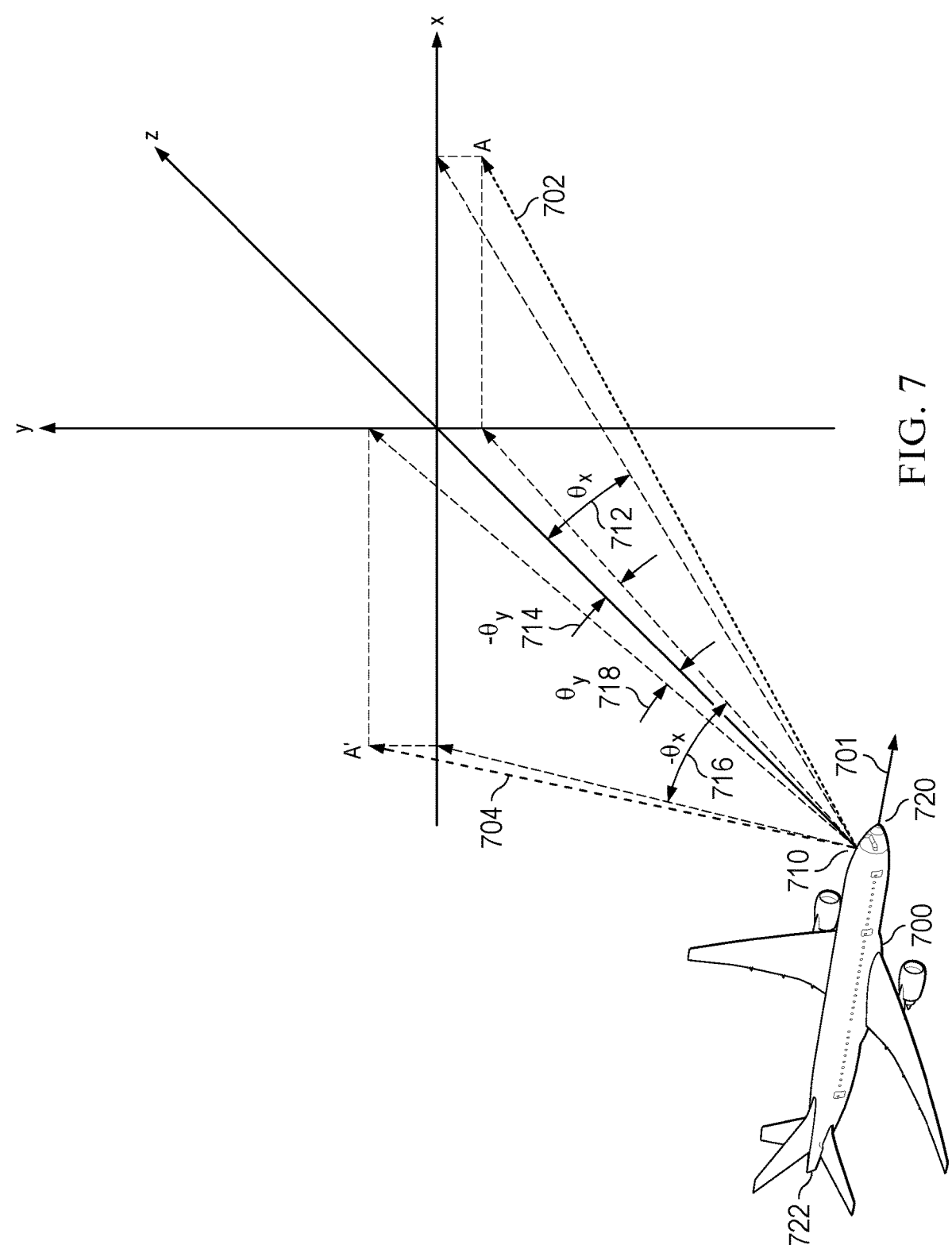
FIG. 7 is an illustration of a diagram of a pair of laser beams emitted in opposite directions in accordance with an illustrative embodiment.

With reference turning next to FIG. 7, an illustration of a diagram of a pair of laser beams emitted in opposite directions is depicted in accordance with an illustrative embodiment. In this illustrative example, the movement direction 701 of aircraft 700 can be described using a velocity vector. As depicted, aircraft 700 emits laser beam A 702 and laser beam A' 704.

These two laser beams are emitted in opposite directions relative to movement direction 701. Laser beam A 702 is emitted in the direction of movement direction 701 for movement of aircraft 700. Laser beam A' 704 is emitted away or in the opposite direction of movement direction 701 for movement of aircraft 700.

Laser beam A 702 can be described as being emitted from point 710 on aircraft 700 at angle $\Theta x$ 712 and angle $-\Theta y$ 714. Laser beam A' 704 can be described as being emitted from point 710 on aircraft 700 at angle $-\Theta x$ 716 and angle $\Theta y$ 718.

In these illustrative examples, emitting laser beam A 702 in the direction of movement direction 701 does not mean that laser beam A 702 must be in a direction parallel to movement direction 701. In a similar fashion, laser beam A' 704 does not need to be emitted in an opposite direction that is parallel to movement direction 701.

In these examples, a target or focal point is selected for laser beam A 702 that is ahead or forward with respect to movement direction 701. In a similar fashion, a target or focal point selected that is behind or opposite to movement direction 701. In some illustrative examples, laser beam A 702 can be emitted in a direction that is parallel to movement direction 701. In other words, a vector describing the direction of laser beam A 702 can be the same as a velocity vector describing movement direction 701.

For example, laser beam A 702 can be emitted in movement direction 701 from nose 720 of aircraft 700. As another example, laser beam A' 704 can be emitted from tail 722 in a direction that is parallel and opposite to movement direction 701.

Figure 8:
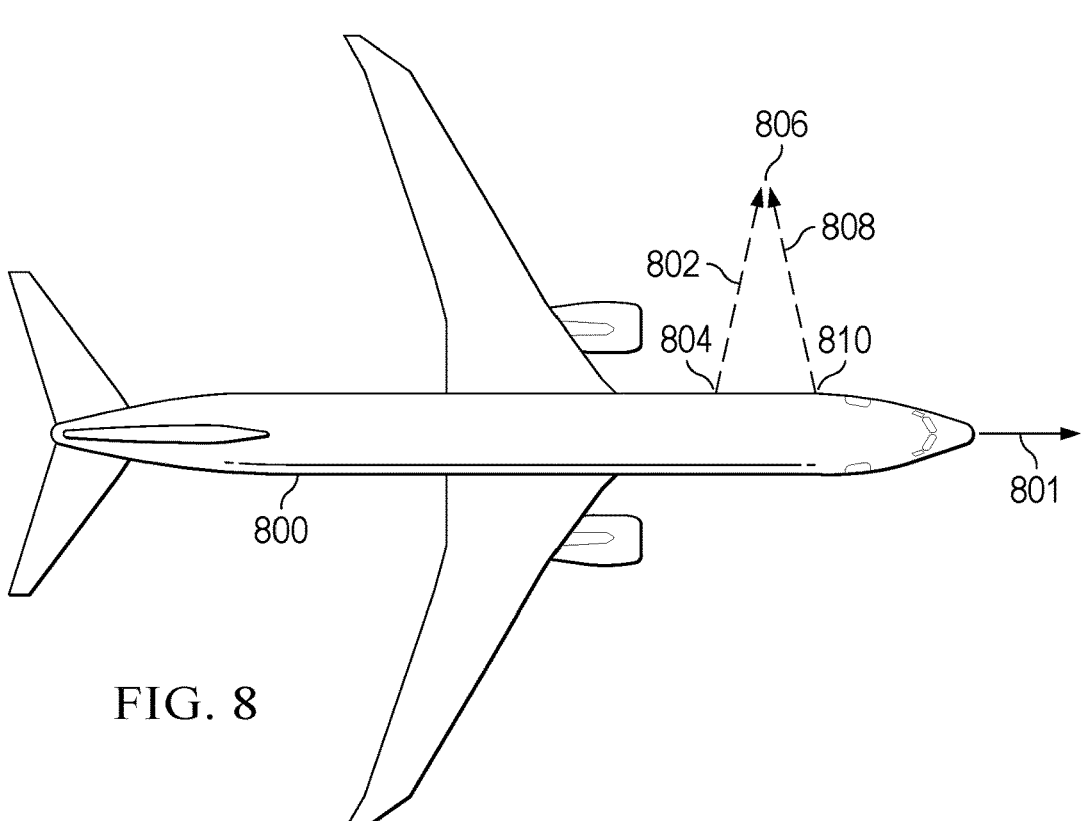
FIG. 8 is an illustration of laser beam emission at a single focal point in accordance with an illustrative embodiment.

With reference next to FIG. 8, an illustration of laser beam emission at a single focal point is depicted in accordance with an illustrative embodiment. As depicted, aircraft 800 moves in movement direction 801.

In this example, aircraft 800 emits first laser beam 802 from first location 804 on aircraft 800 in a first direction at focal point 806. In this example, first laser beam 802 is emitted in the direction of movement direction 801. Focal point 806 is a point in space where both laser beams are aimed. The two laser beams can intersect at focal point 806. In response to emitting first laser beam 802, a first backscatter light is generated that has a positive frequency shift from a frequency of the first laser beam.

Aircraft 800 also emits second laser beam 808 from second location 810 on aircraft 800 a second direction at focal point 806. As depicted, second location 810 is on the same side of aircraft 800 as first location 804.

In this example, second laser beam 808 is emitted in the opposite direction of movement direction 801. In this example, the emission of second laser beam 808 results in a second backscatter light being generated that has a negative frequency shift from a frequency of the second laser beam. In this illustrative example, both first laser beam 802 and second laser beam 808 have the same frequency.

Figure 9:
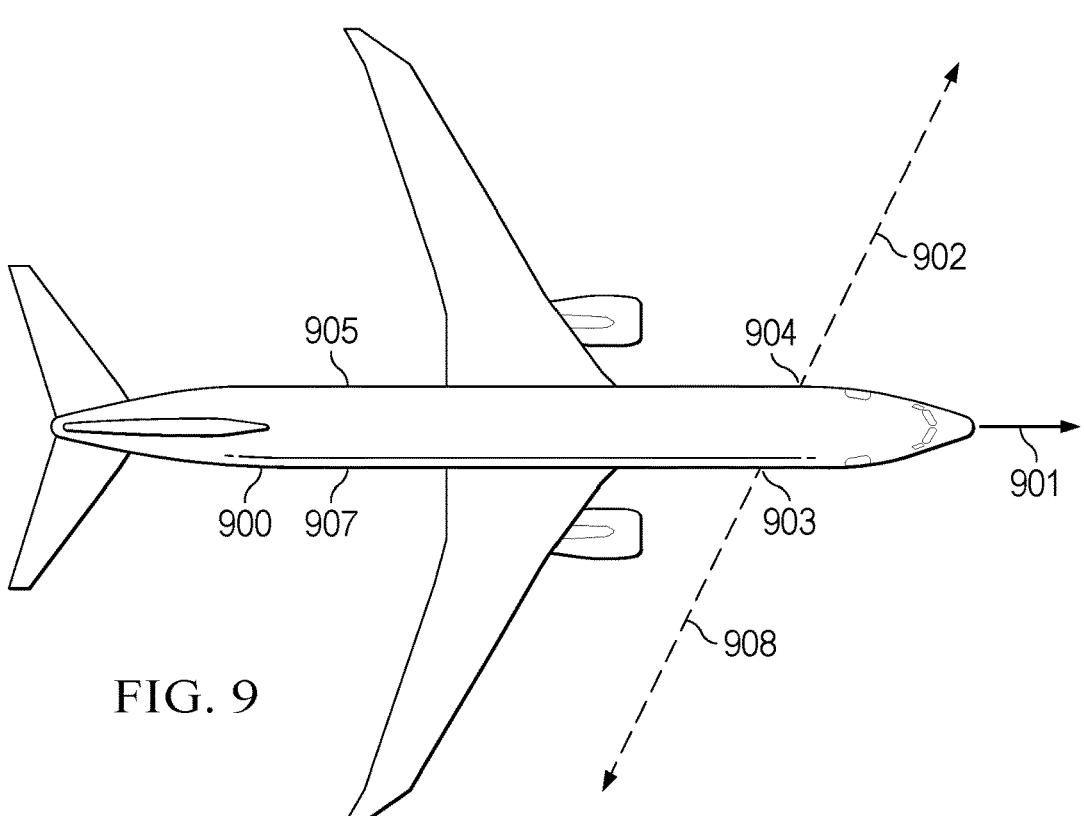
FIG. 9 is an illustration of laser beam emissions from two sides of an aircraft in accordance with an illustrative embodiment.

In FIG. 9, an illustration of laser beam emissions from two sides of an aircraft is depicted in accordance with an illustrative embodiment. As depicted, aircraft 900 moves in a movement direction 901.

In this example, aircraft 900 emits first laser beam 902 from first location 904 on first side 905 of aircraft 900 in a first direction. This first direction is in the direction of movement direction 901.

In this example, first laser beam 902 is emitted in the direction of movement direction 901. In response to emitting first laser beam 902, a first backscatter light is generated that has a positive frequency shift from a frequency of first laser beam 902.

Aircraft 900 also emits second laser beam 908 from second location 903 on second side 907 of aircraft 900 in a second direction. As depicted, second location 903 is on an opposite side of aircraft 900 from first location 904.

In this example, second laser beam 908 is emitted in the opposite direction to movement direction 901. In this example, the emission of second laser beam 908 results in a second backscatter light being generated that has a negative frequency shift from the frequency of second laser beam 908. In this illustrative example, both first laser beam 902 and second laser beam 908 have the same frequency.

Figure 10:
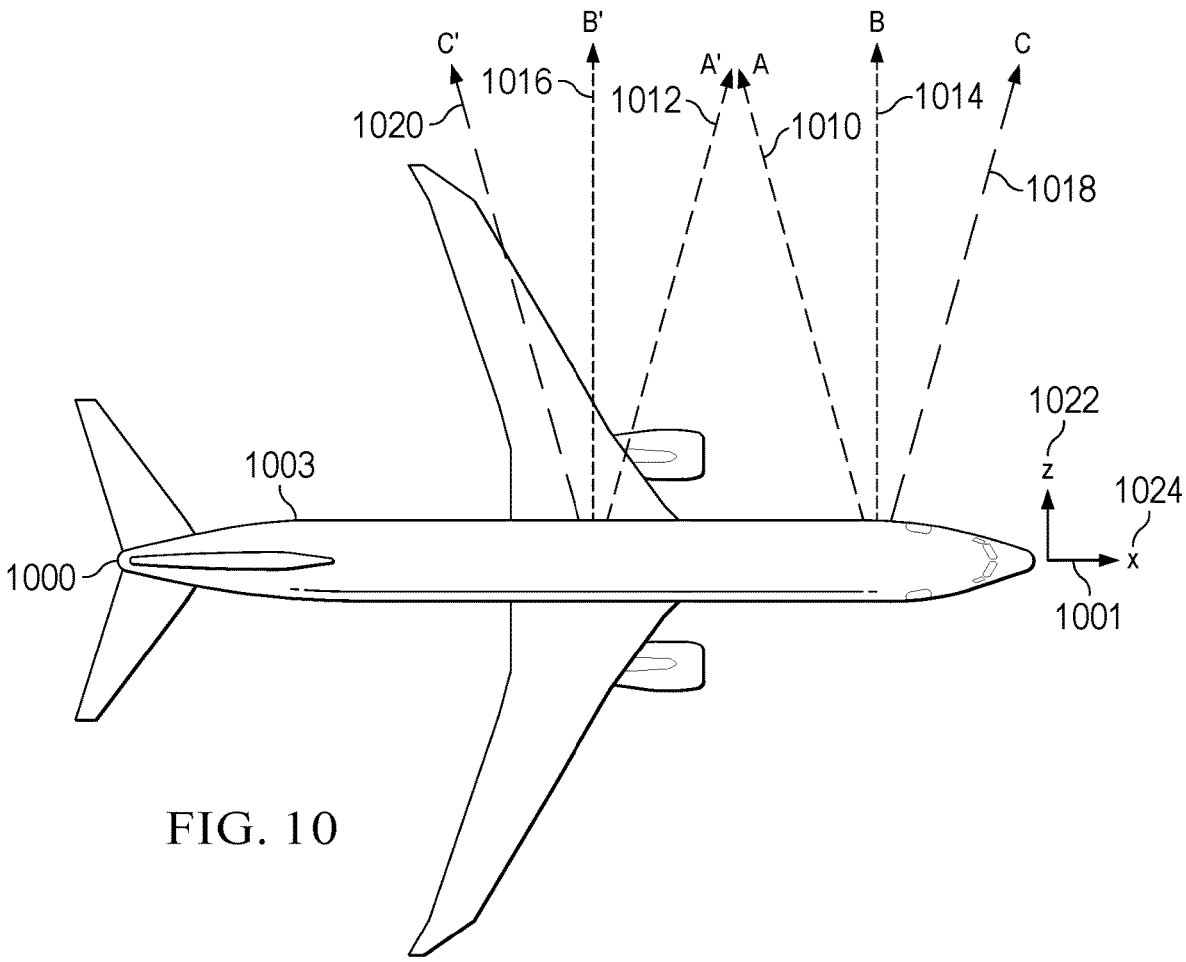
FIG. 10 is an illustration of laser beam emissions from a side of an aircraft in accordance with an illustrative embodiment.

Turning to FIG. 10, an illustration of laser beam emissions from a side of an aircraft is depicted in accordance with an illustrative embodiment. As depicted, aircraft 1000 moves in movement direction 1001.

As depicted, aircraft 1000 emits multiple laser beans from side 1003. As depicted, these laser beams are emitted as pairs of laser beams in which the laser beams in each pair are emitted in opposite directions with respect to movement direction 1001. These opposite directions are selected to increase or result in a frequency shift that is double of just one of the laser beams and a pair of laser beams.

In this example, one pair of laser beams comprises laser beam A 1010 and laser beam A' 1012. A second pair of laser beams comprises laser beam B 1014 and laser beam B' 1016. The third pair of laser beams comprises laser beam C 1018 and laser beam C' 1020. In this example, all three pairs of laser beams are emitted from the same side of aircraft 1000. These three pairs of laser beams can be used to determine different components of speed for aircraft 1000. In other words, these three laser beams can be used to determine a velocity for aircraft 1000, which is a speed and direction of movement of aircraft 1000.

As depicted, the two laser beams in each pair of laser beams are emitted in opposite directions of each other with one laser beam being emitted in the direction of movement direction 901 and the other laser beam emitted in the opposite direction of movement direction 901.

For example, laser beam A 1010 is emitted in the direction of movement direction 1001. Laser beam A 1012 is emitted in a direction that is opposite of movement direction 1001. In this example, laser beam B 1014 and laser beam B' 1016 are emitted in opposite directions with respect to each other on a y-axis (not shown) that is perpendicular to x-axis 1024 and z-axis 1022.

If movement direction 1001 of aircraft 1000 is only in the direction of x-axis 1024 without a y component, then a frequency shift does not occur between the backscatter light from laser beam B 1014 and laser beam B' 1016 because aircraft 1000. This lack of frequency shift occurs when movement direction 1001 does not involve aircraft 1000 climbing or diving.

Figure 11:
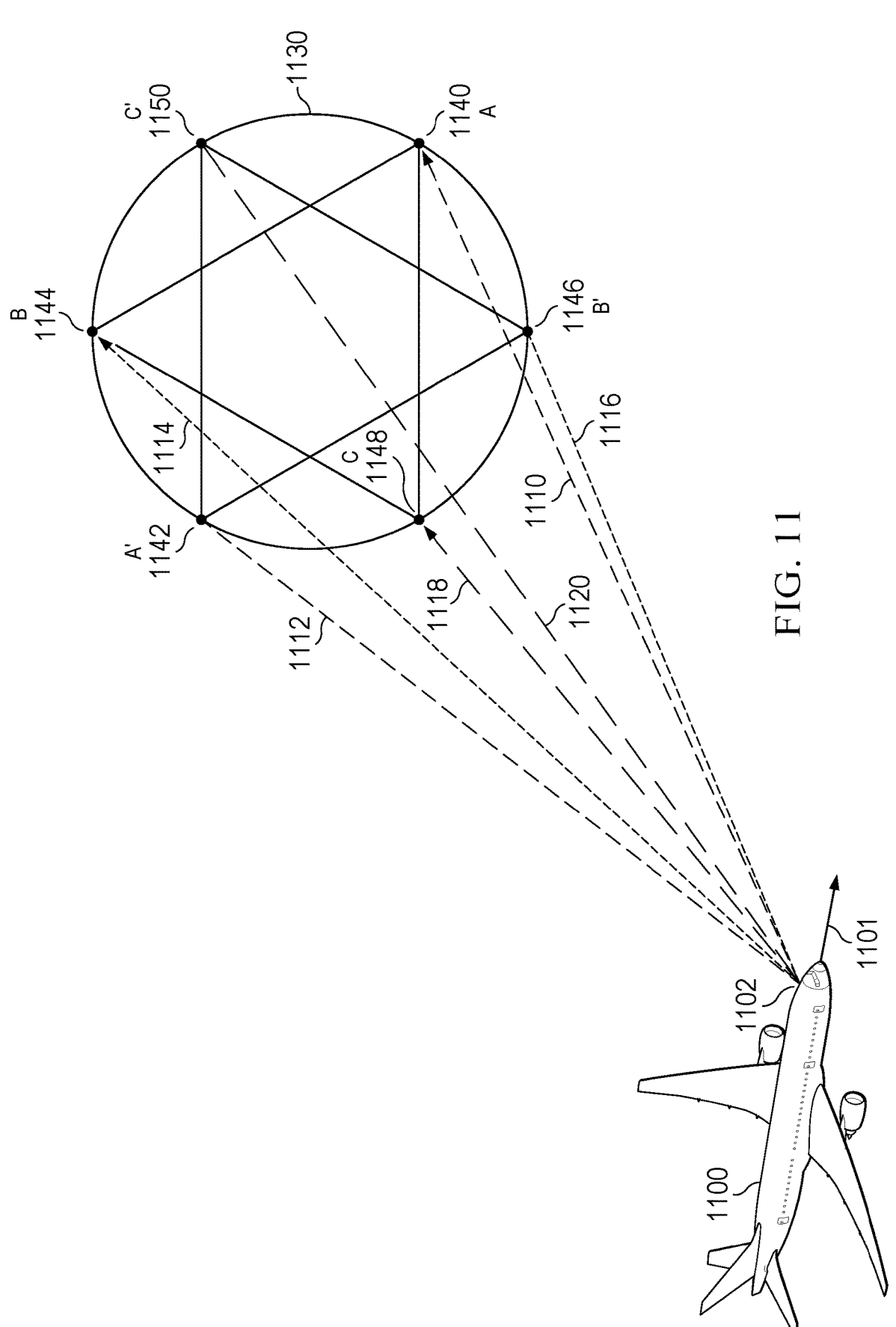
FIG. 11 is an illustration of laser beam emissions from a single location on an aircraft in accordance with an illustrative embodiment.

With reference next to FIG. 11, an illustration of laser beam emissions from a single location on an aircraft is depicted in accordance with an illustrative embodiment. As depicted, aircraft 1100 moves in movement direction 1101.

As depicted, laser beams are emitted from location 1102 on aircraft 1100. These laser beams are emitted as pairs of laser beams. In each pair of laser beams, a first laser beam is emitted in movement direction 1101 of aircraft 1100 while the second laser beam is emitted in an opposite direction of movement direction 1101 of aircraft 1100.

In this illustrative example, three pairs of laser beams are emitted in directions such that three pairs of backscatter light are generated and detected in response to these three pairs of laser beams. The backscatter light detected from the emission of these three pairs of laser beams can be used to determine a velocity for aircraft 1100. In other words, the pairs of backscatter light can be used to determine a speed and direction of movement of aircraft 1100.

In this illustrative example, the three pairs of laser beams comprise laser beam A 1110 and laser beam A' 1112 for a first pair of laser beams. Laser beam B 1114 and laser beam B' 1116 are a second pair of laser beams. In this example, laser beam C 1118 and laser beam C' 1120 are a third pair of laser beams.

In this illustrative example, the directions of the pairs of laser beams with respect to each other can be visualized with the aid of plane 1130. In this illustrative example, the different laser beams are directed at points on plane 1130. As depicted, laser beam A 1110 is directed at point 1140 and laser beam A' 1112 is directed at point 1142. In this example, laser beam B 1114 is directed at point 1144 and laser beam B' 1116 is directed at point 1146. As shown in this figure, laser beam C 1118 is directed at point 1148 and laser beam C' 1120 is directed at point 1150.

In this example, with aircraft 1100 traveling in movement direction 1101. With the emission of these laser beams in the directions illustrated, laser beam A 1110 is emitted in a direction towards movement direction 1101 and laser beam A' 1112 is emitted in a direction away or opposite to movement direction 1101 in this first pair of laser beams. As a result, backscatter light having a positive frequency shift is detected in response to laser beam A 1110, backscatter light having a negative frequency shift is detected in response to laser beam A' 1112.

In the second pair of laser beams, laser beam B' 1116 is emitted in a direction towards movement direction 1101 resulting in backscatter light having a positive frequency shift and laser beam B 1114 is emitted in a direction away or opposite to movement direction 1101 resulting in back-scatter light having a negative frequency shift. In this depicted example, laser beam B' 1116 is considered to be in the direction of movement direction 1101 because movement direction 1101 includes aircraft 1100 moving downward or descending.

In the third pair of laser beams, laser beam C' 1120 is emitted in a direction towards movement direction 1101 resulting in backscatter light having a positive frequency shift. In this pair of laser beams, laser beam C 1118 is emitted in a direction away or opposite to movement direction 1101 resulting in backscatter light having a negative frequency shift.

Figure 12:
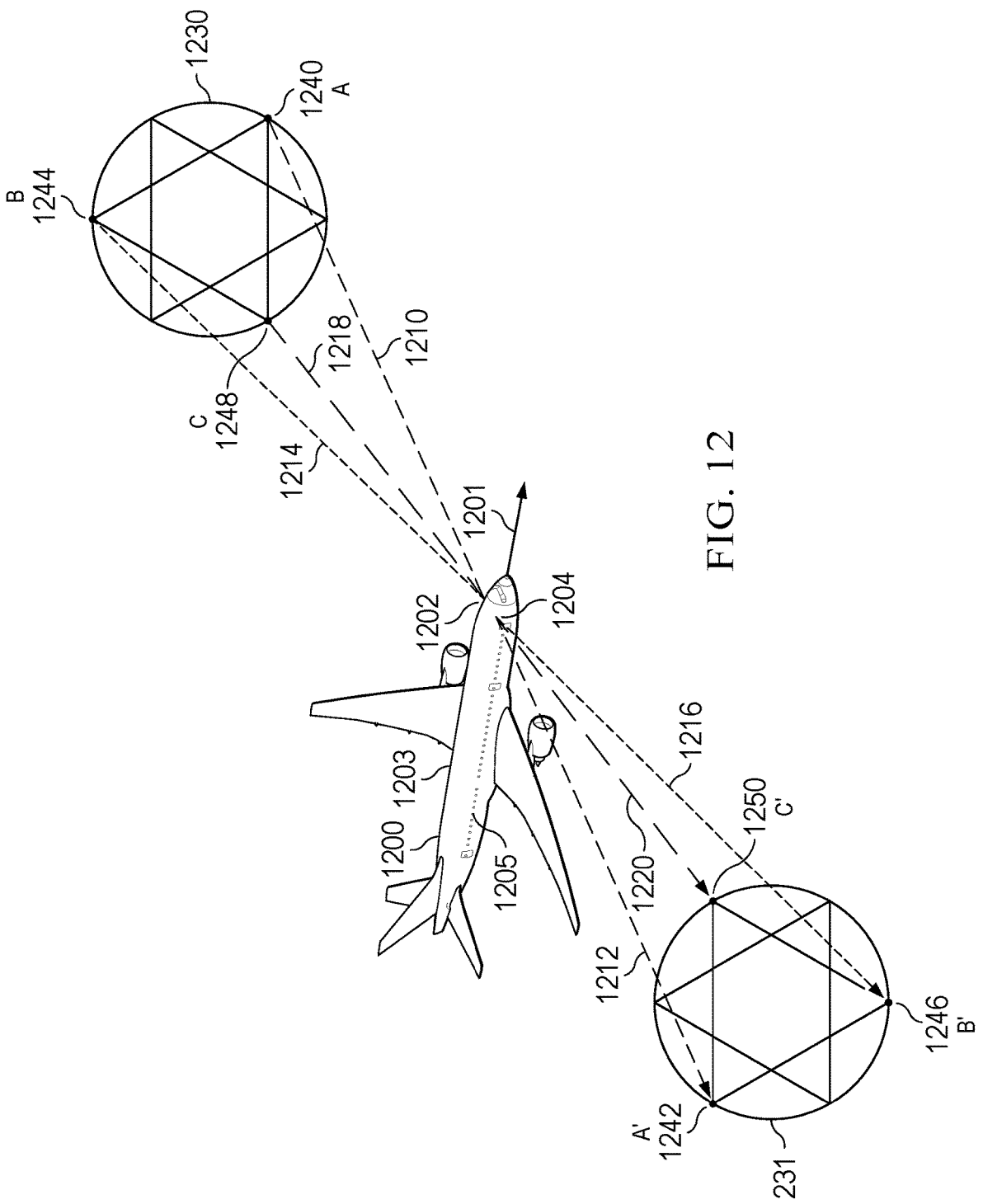
FIG. 12 is an illustration of laser beam emissions from two locations on an aircraft in accordance with an illustrative embodiment.

Turning to FIG. 12, an illustration of laser beam emissions from two locations on an aircraft is depicted in accordance with an illustrative embodiment. As depicted, aircraft 1200 moves in movement direction 1201.

As depicted, laser beams are emitted as pairs of laser beams from location 1202 on first side 1203 and location 1204 on second side 1205 of aircraft 1200. In this example, first side 1203 is located on opposite side of second side 1205 on aircraft 1200.

In each pair of laser beams, a first laser beam is emitted in movement direction 1201 of aircraft 1200 while the second laser beam is emitted in an opposite direction of movement direction 1201 of aircraft 1200. Each laser beam in a pair of laser beams is emitted from a location on a side of the aircraft that is opposite to the other laser beam in the pair of laser beams.

In this example, three pairs of laser beams are emitted in directions such that three pairs of backscatter light are generated and detected in response to emitting these pairs of laser beams. The three pairs of laser beams can be used to determine a velocity for aircraft 1100. In other words, the pairs of backscatter light can be used to determine a speed and direction of movement of aircraft 1100.

In this illustrative example, the three pairs of laser beams comprise laser beam A 1210 and laser beam A' 1212 for a first pair of laser beams. Laser beam B 1214 and laser beam B' 1216 are a second pair of laser beams. Laser beam C 1218 and laser beam C' 1220 are a third pair of laser beams.

In this illustrative example, the directions of the pairs of laser beams with respect to each other can be visualized with the aid of plane 1230 and plane 1231. In this illustrative example, the different laser beams are directed at points on plane 1230 and plane 1231. One laser beam in the pair of laser beams is directed at plane 1230 while the second laser beam in the pair of laser beams is directed at plane 1231 in this example.

As depicted, laser beam A 1210 is directed at point 1240 and laser beam A' 1212 is directed at point 1242. In this example, laser beam B 1214 is directed at point 1244 and laser beam B' 1216 is directed at point 1246. As shown, laser beam C 1218 is directed at point 1248 and laser beam C' 1220 is directed at point 1250.

Figure 13:
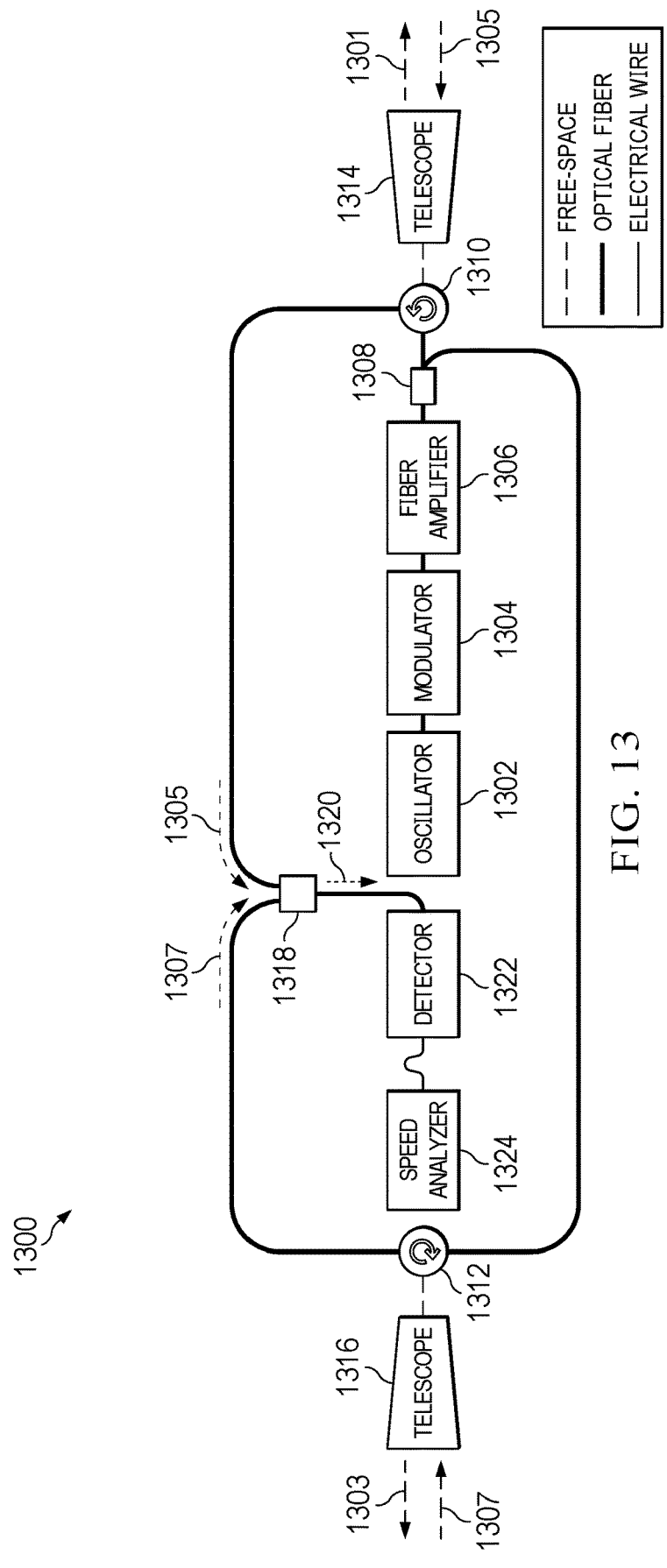
FIG. 13 is an illustration of a speed detection system in accordance with an illustrative embodiment.

With reference next to FIG. 13, an illustration of a speed detection system is depicted in accordance with an illustrative embodiment. In this illustrative example, speed detection system 1300 is an example of an implementation for speed detection system 204 in FIG. 2.

As depicted, speed detection system 1300 comprises a number of different components. For example, some of the components in speed detection system 1300 are oscillator 1302, modulator 1304, fiber amplifier 1306, splitter 1308, interference coupler 1318, circulator 1310, circulator 1312, telescope 1314, and telescope 1316. These components are examples of components that can be used to implement laser beam generator 206 in FIG. 2.

In this example, oscillator 1302 is a coherent optical oscillator that operates to generate a coherent signal through resonant oscillation without needing an input signal. In this illustrative example, oscillator 1302 generates the coherent light that is used to emit first laser beam 1301 and second laser beam 1303. First laser beam 1301 and second laser beam 1303 are outgoing laser beams and can also be referred to as outgoing laser light or transmitted laser beams.

In this illustrative example, modulator 1304 is connected to oscillator 1302 and operates to manipulate the property of the coherent light generated by oscillator 1302. For example, modulator 1304 can change or manipulate the coherent light to obtain desired property such as intensity, phase, polarization, or other property. Fiber amplifier 1306 operates to amplify or boost the coherent light generated by oscillator 1302 and modulated by modulator 1304. Fiber amplifier 1306 is connected to splitter 1308.

In this example, splitter 1308 is connected to circulator 1310 and circulator 1312. A portion of the coherent light is directed to circulator 1310 and another portion of the coherent light is directed to circulator 1312.

In this depicted example, circulator 1310 and circulator 1312 are optical circulators in the form of a port devices such that light entering a port exits on the next port in these circulators. As depicted, the connections between oscillator 1302, modulator 1304, fiber amplifier 1306, splitter 1308, interference coupler 1318, circulator 1310, and circulator 1312 can be made using optical fibers.

In this illustrative example, circulator 1310 is in communication with telescope 1314 and circulator 1312 is in communication with telescope 1316. This communication can be through a connection, such as for example, an optical fiber or free space.

As depicted, telescope 1314 emits first laser beam 1301 and telescope 1316 emits second laser beam 1303. First backscatter light 1305 can be received by telescope 1314 in response to the emission or transmission of first laser beam 1301, and second backscatter light 1307 can be received by telescope 1316 in response to the emission or transmission of second laser beam 1303. In this example, first backscatter light 1305 and second backscatter light 1307 can be received in response to the transmission of first laser beam 1301 and second laser beam 1303 into the atmosphere. First backscatter light 1305 results from the scattering of first laser beam 1301 by various particles in the atmosphere, and second backscatter light 1307 results from the scattering of second laser beam 1303 by various particles in the atmosphere In this example, telescope 1314 and telescope 1316 also operate as components for a receiver, such as receiver 207 in FIG. 2. First backscatter light 1305 travels to circulator 1310 which directs first backscatter light 1305 to interference coupler 1318. Second backscatter light 1307 travels to circulator 1312 which directs second backscatter light 1307 to interference coupler 1318.

In this example, interference coupler 1318 can be, for example, a 3 DB coupler. Interference coupler 1318 interferes first backscatter light 1305 and second backscatter light 1307 with each other to generate interfered light 1320 that is sent to detector 1322. The interference results from interference coupler 1318 combining first backscatter light 1305 and second backscatter light 1307 with each other.

In this illustrative example, detector 1322 is an example of a detector that can be used to implement detection system 210 in FIG. 2. This detector is a hardware component that can detect the power of light input into the detector.

In this example, detector 1322 can detect the power in interfered light 1320. The power has a frequency that is a beat frequency resulting from interfering first backscatter light 1305 with second backscatter light 1307.

Detector 1322 is speed analyzer 1324. In this illustrative example, this connection can be a wired connection. In other illustrative examples, an optical, wireless, or other suitable connection can be used.

Speed analyzer 1324 is an example of speed analyzer 212 in FIG. 2 and can be at least one of a software process, hardware, or a combination thereof that operate to determine speed from the beat frequency. The increase in frequency shift for first backscatter light 1305 and second backscatter light 1307 in response to the direction of first laser beam 1301 and second laser beam 1303 in different directions can increase the ability to determine speed as compared to other techniques that compare a reference light to a backscatter light. As a result, an increased level performance occurs in determining the speed of the vehicle as compared to current speed analyzers.

Speed detection system 1300 in the depicted example is an implementation of speed detection system 204 in FIG. 2 and not meant to limit the manner in which other implementations can occur. For example, the components in speed detection system 1300 are depicted for a pair of laser beams. These components can be duplicated for additional pairs of laser beams.

In yet other illustrative examples, speed detection system 1300 can be modified to include additional splitters, telescopes, interference couplers, and detectors to emit additional pairs of laser beams and detect additional pairs of backscatter light.

Turning next to FIG. 14, an illustration of a flowchart of a process for determining speed for a vehicle is depicted in accordance with an illustrative embodiment. The process in FIG. 14 can be implemented in hardware, software, or both.

When implemented in software, the process can take the form of program instructions that are run by one of more processor units located in one or more hardware devices in one or more computer systems. For example, the process can be implemented in speed detection system 204 in FIG. 2 and speed detection system 1300 in FIG. 13.

The process begins by emitting laser beams into an atmosphere from the vehicle (operation 1400). In operation 1400, the laser beams are emitted in different directions from the vehicle.

The process detects sets of backscatter light generated in response to transmitting the laser beams into the atmosphere from the vehicle (operation 1402). In operation 1402, the sets of backscatter light have frequency shifts relative to the frequency of the laser beams.

The process measures a set of beat frequencies from interfering the sets of backscatter light with each other (operation 1404). The process determines the speed of the vehicle using the set of beat frequencies (operation 1406). The process terminates thereafter.

With reference to FIG. 15, an illustration of a flowchart of a process for interfering backscatter light depicted in accordance with an illustrative embodiment. The operations in FIG. 15 are examples of additional operations that can be used with the operations in the process in FIG. 14.

The process interferes the sets of backscatter light with each other (operation 1500). In operation 1500, a set of interfered lights having a set of beat frequencies is generated. The process terminates thereafter.

Figure 16:
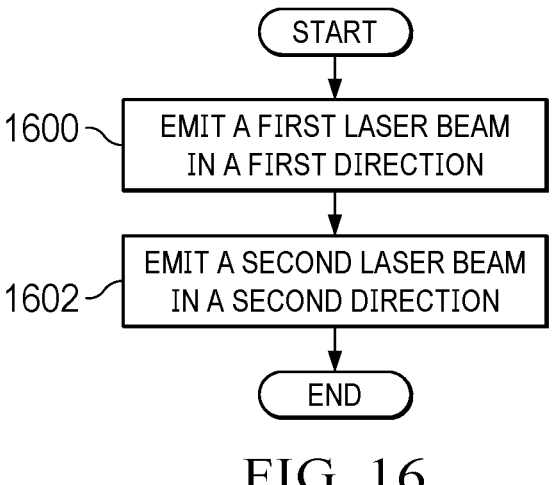
FIG. 16 is an illustration of a flowchart of a process for emitting laser beams in different directions in accordance with an illustrative embodiment.

Turning to FIG. 16, an illustration of a flowchart of a process for emitting laser beams in different directions is depicted in accordance with an illustrative embodiment. The process in FIG. 16 is an example of an implementation of operation 1400 in FIG. 14.

The process begins by emitting a first laser beam in a first direction (operation 1600). In operation 1600, a first backscatter light having a positive frequency shift from a frequency of the first laser beam is generated in response to emitting the first laser beam.

The process emits a second laser beam in a second direction (operation 1602). In operation 1602, a second backscatter light having negative frequency shift from a frequency of the second laser beam is generated in response to emitting the second laser beam. The process terminates thereafter.

Figure 17:
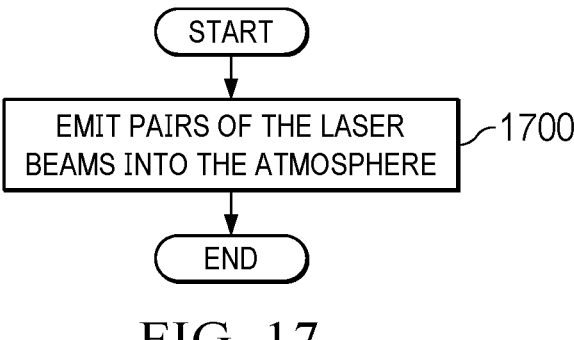
FIG. 17 is an illustration of a flowchart of a process for emitting pairs of laser beams in accordance with an illustrative embodiment.

With reference to FIG. 17, an illustration of a flowchart of a process for emitting pairs of laser beams is depicted in accordance with an illustrative embodiment. The process in FIG. 17 is an example of an implementation of operation 1400 in FIG. 14.

The process emits pairs of the laser beams into the atmosphere (operation 1700). The process terminates thereafter.

In operation 1700, the laser beams in a pair of the laser beams in the pairs of the laser beams are directed at opposite directions relative to a velocity vector for a movement of the vehicle. A pair of backscatter lights is generated in response to the pair of the laser beams in which a first backscatter light in the pair of backscatter lights has a positive frequency shift and a second backscatter light in the pair of backscatter lights has a negative frequency shift.

Figure 18:
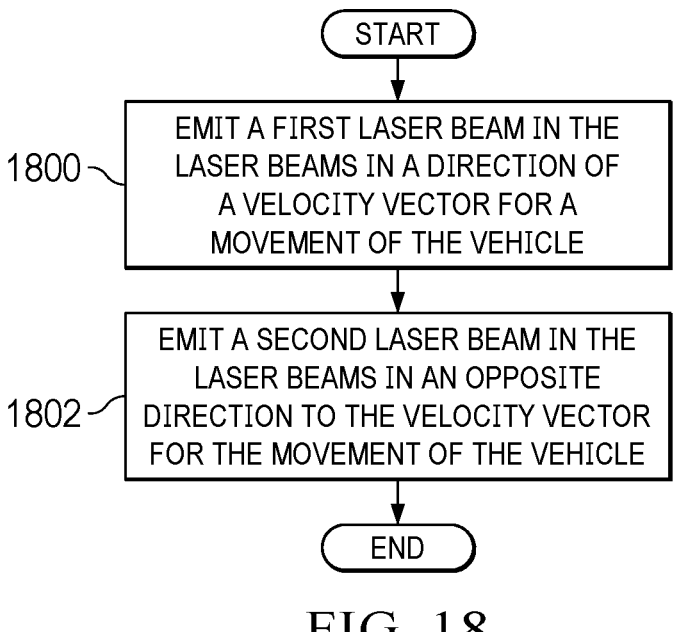
FIG. 18 is an illustration of a flowchart of a process for emitting laser beams in accordance with an illustrative embodiment.

Turning next to FIG. 18, an illustration of a flowchart of a process for emitting laser beams is depicted in accordance with an illustrative embodiment. The processes in FIG. 18 are examples of an implementation of operation 1400 in FIG. 14.

The process begins by emitting a first laser beam in the laser beams in a direction of a velocity vector for a movement of the vehicle (operation 1800). The process emits a second laser beam the laser beams in an opposite direction to the velocity vector for the movement of the vehicle (operation 1802). The process terminates thereafter.

Figure 19:
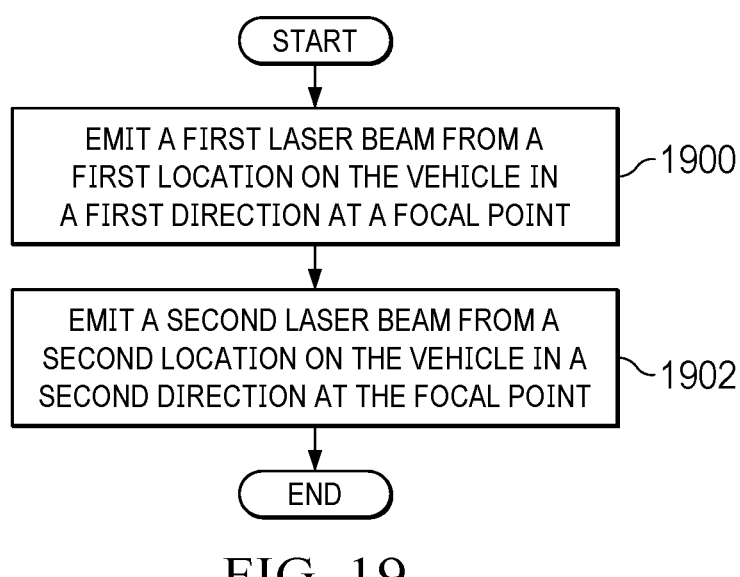
FIG. 19 is an illustration of a flowchart of a process for emitting a first and a second laser beam at a focal point in accordance with an illustrative embodiment.

With reference to FIG. 19, an illustration of a flowchart of a process for emitting a first and a second laser beam at a focal point is depicted in accordance with an illustrative embodiment. The processes in FIG. 19 are examples of an implementation of operation 1400 in FIG. 14.

The process begins by emitting a first laser beam from a first location on the vehicle in a first direction at a focal point (operation 1900). In operation 1900, a first backscatter light is generated that has a positive frequency shift from a frequency of the first laser beam in response to emitting the first laser beam.

The process emits a second laser beam from a second location on the vehicle in a second direction at the focal point (operation 1902). In operation 1902, a second backscatter light is generated that has a negative frequency shift from a frequency of the second laser beam in response to emitting the second laser beam. The process terminates thereafter.

With reference to FIG. 20, an illustration of a flowchart of a process for emitting laser beams into an atmosphere from a location on a side of a vehicle is depicted in accordance with an illustrative embodiment. The processes in FIG. 20 are examples of an implementation of operation 1400 in FIG. 14.

The process begins by emitting a first laser beam in a first direction from a location on a side of the vehicle (operation 2000). In operation 2000, a first backscatter light has a positive frequency shift from a frequency of the first laser beam.

The process emits a second laser beam in a second direction from the location on the side of the vehicle (operation 2002). In operation 2002, a second backscatter light has a negative frequency shift from a frequency of the second laser beam. The process terminates thereafter.

Turning to FIG. 21, an illustration of a flowchart of a process for emitting laser beams into an atmosphere from locations on different sides of a vehicle is depicted in accordance with an illustrative embodiment. The processes in FIG. 21 are examples of an implementation of operation 1400 in FIG. 14.

The process begins by emitting a first laser beam in a first direction from a first location on a first side of the vehicle (operation 2100). In operation 2100, a first backscatter light has a positive frequency shift from a frequency of the first laser beam.

The process emits a second laser beam in a second direction from a second location on a second side of the vehicle opposite to the first side (operation 2102). In operation 2102, a second backscatter light has a negative frequency shift from a frequency of the second laser beam. The process terminates thereafter.

Figure 22:
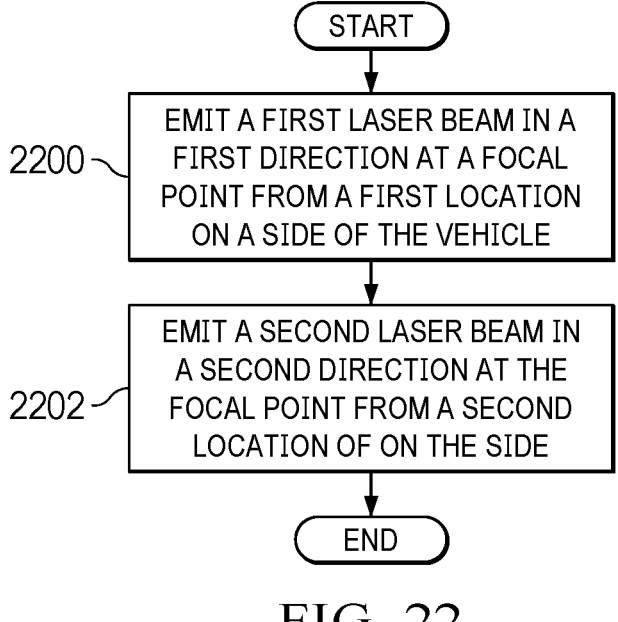
FIG. 22 is an illustration of a flowchart of a process emitting laser beams in different directions into an atmosphere from different locations on a side of a vehicle in accordance with an illustrative embodiment.

Turning next to FIG. 22, an illustration of a flowchart of a process emitting laser beams in different directions into an atmosphere from different locations on a side of a vehicle is depicted in accordance with an illustrative embodiment. The processes in FIG. 22 are examples of an implementation of operation 1400 in FIG. 14.

The process begins by emitting a first laser beam in a first direction at a focal point from a first location on a side of the vehicle (operation 2200). In operation 2200, a first backscatter light has a positive frequency shift from a frequency of the first laser beam.

The process emits a second laser beam in a second direction at the focal point from a second location of on the side (operation 2202). In operation 2202, a second backscatter light has a negative frequency shift from a frequency of the second laser beam. The process terminates thereafter.

Figure 23:
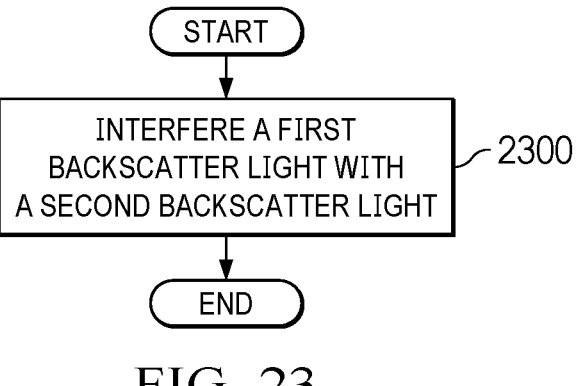
FIG. 23 is an illustration of a flowchart of a process for interfering backscatter light with an illustrative embodiment.

With reference to FIG. 23, an illustration of a flowchart of a process for interfering backscatter light is depicted in accordance with an illustrative embodiment. The process in FIG. 23 is an example of an implementation of operation 1500 in FIG. 15.

The process interferes a first backscatter light with a second backscatter light (operation 2300). In operation 2300, the first backscatter light is detected in response to a first laser beam in a first direction and the second backscatter light is detected in response to a second laser beam in a second direction. The process terminates thereafter.

Figure 24:
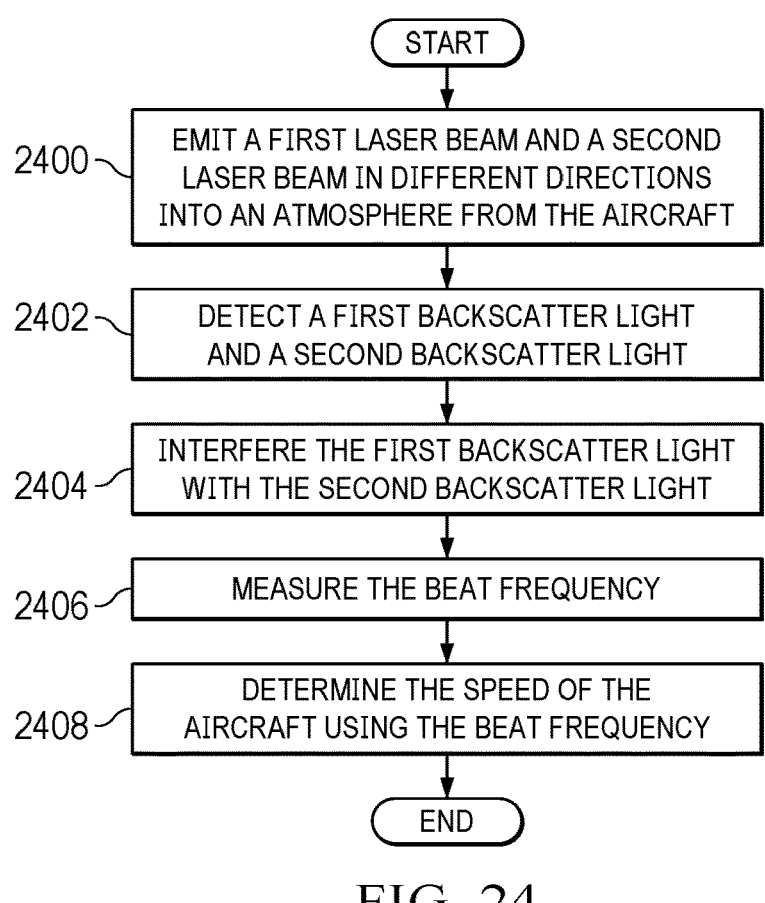
FIG. 24 is an illustration of a flowchart of a process for detecting a speed of an aircraft in accordance with an illustrative embodiment.

Turning to FIG. 24, an illustration of a flowchart of a process for detecting a speed of an aircraft is depicted in accordance with an illustrative embodiment. The process in FIG. 24 can be implemented in hardware, software, or both. When implemented in software, the process can take the form of program instructions that is run by one of more processor units located in one or more hardware devices in one or more computer systems. For example, the process can be implemented in in speed detection system 204 in FIG. 2 and speed detection system 1300 in FIG. 13.

The process begins by emitting a first laser beam and a second laser beam in different directions into an atmosphere from the aircraft (operation 2400). The process detects a first backscatter light and a second backscatter light (operation 2402). In operation 2402, the first backscatter light having a positive frequency shift is generated in response to emitting the first laser beam and the second backscatter light having a negative frequency shift is generated in response to emitting the second laser beam.

The process interferes the first backscatter light with the second backscatter light (operation 2404). In operation 2404, an interfered light having a beat frequency is generated.

The process measures the beat frequency (operation 2406). The process determines the speed of the aircraft using the beat frequency (operation 2408). The process terminates thereafter.

Figure 25:
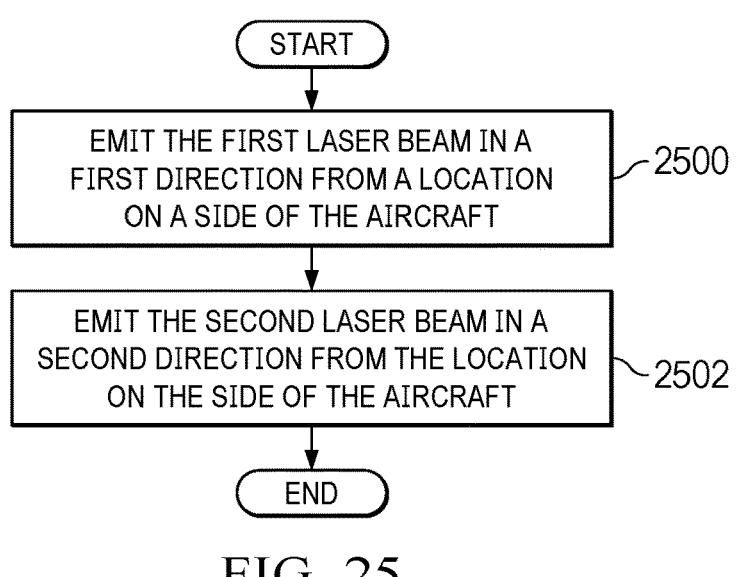
FIG. 25 is an illustration of a flowchart of a process for emitting laser beams into an atmosphere from a location on a side of an aircraft in accordance with an illustrative embodiment.

Turning next to FIG. 25, an illustration of a flowchart of a process for emitting laser beams into an atmosphere from a location on a side of an aircraft is depicted in accordance with an illustrative embodiment. The processes in FIG. 25 are examples of an implementation of operation 2400 in FIG. 24.

The process begins by emitting the first laser beam in a first direction from a location on a side of the aircraft (operation 2500). In operation 2500, the first backscatter light has the positive frequency shift from a frequency of the first laser beam.

The process emits the second laser beam in a second direction from the location on the side of the aircraft (operation 2502). In operation 2502, the second backscatter light has a negative frequency shift from a frequency of the second laser beam. The process terminates thereafter.

Figure 26:
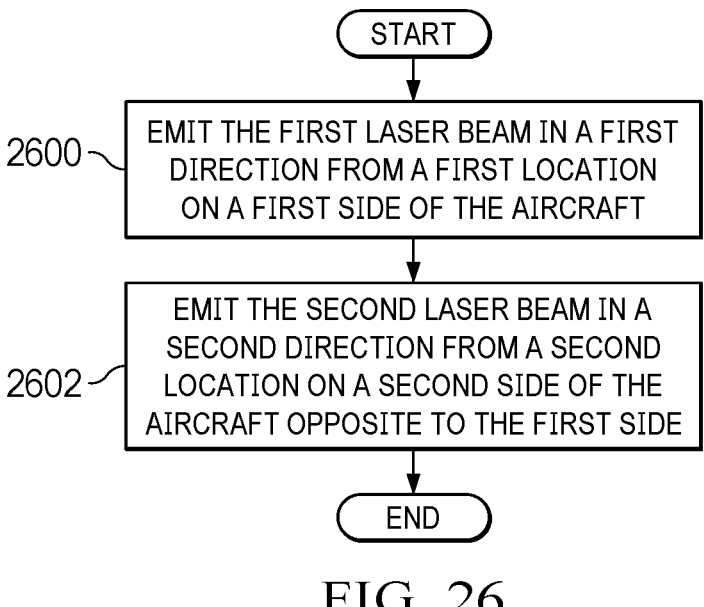
FIG. 26 is an illustration of a flowchart of a process for emitting laser beams in different directions into an atmosphere from different locations on different sides of an aircraft in accordance with an illustrative embodiment.

Turning to FIG. 26, an illustration of a flowchart of a process for emitting laser beams in different directions into an atmosphere from different locations on different sides of an aircraft is depicted in accordance with an illustrative embodiment. The processes in FIG. 26 are examples of an implementation of operation 2400 in FIG. 24.

The process begins by emitting the first laser beam in a first direction from a first location on a first side of the aircraft (operation 2600). In operation 2600, the first backscatter light has the positive frequency shift from a frequency of the first laser beam.

The process emits the second laser beam in a second direction from a second location on a second side of the aircraft opposite to the first side (operation 2602). In operation 2602, the second backscatter light has the negative frequency shift from a frequency of the second laser beam. The process terminates thereafter.

Figure 27:
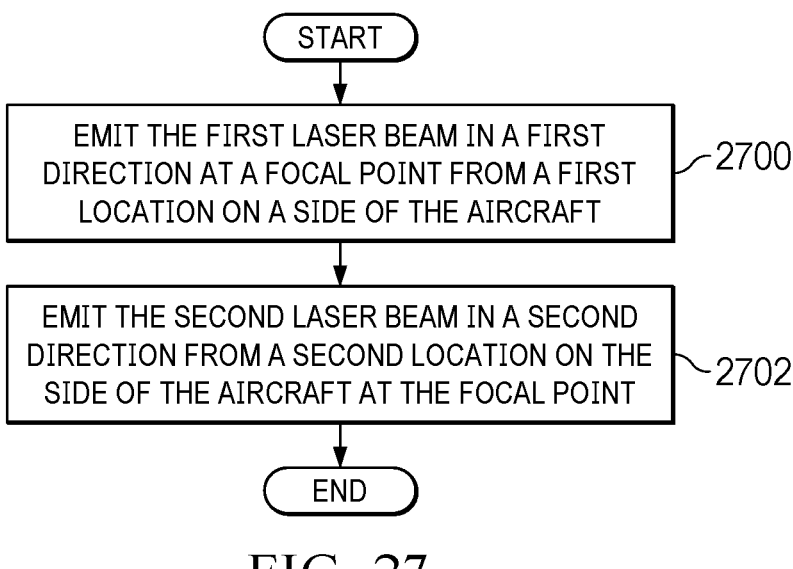
FIG. 27 is an illustration of a flowchart of a process for emitting laser beams in different directions at focal points from different location on a side of an aircraft in accordance with an illustrative embodiment.

With reference to FIG. 27, an illustration of a flowchart of a process for emitting laser beams in different directions at focal points from different locations on a side of an aircraft is depicted in accordance with an illustrative embodiment. The processes in FIG. 27 are examples of an implementation of operation 2400 in FIG. 24.

The process begins by emitting the first laser beam in a first direction at a focal point from a first location on a side of the aircraft (operation 2700). In operation 2700, the first backscatter light has the positive frequency shift from a frequency of the first laser beam.

The process emits the second laser beam in a second direction from a second location on the side of the aircraft at the focal point (operation 2702). In operation 2702, the second backscatter light has the negative frequency shift from a frequency of the second laser beam. The process terminates thereafter.

Turning next to FIG. 28, an illustration of a flowchart of a process for detecting a speed of an aircraft is depicted in accordance with an illustrative embodiment. The process in FIG. 28 can be implemented in hardware, software, or both. When implemented in software, the process can take the form of program instructions that is run by one of more processor units located in one or more hardware devices in one or more computer systems. For example, the process can be implemented in speed detection system 204 in FIG. 2 and speed detection system 1300 in FIG. 13.

The process begins by emitting a first pair of laser beams from a location on the aircraft (operation 2800). In operation 2800, the first pair of laser beams is emitted at a first pair of focal points that results in a first pair of backscatter lights having first opposite frequency shifts.

The process emits a second pair of laser beams from the location on the aircraft (operation 2802). In operation 2802, the second pair of laser beams is emitted at a second pair of focal points that results in a second pair of backscatter lights having second opposite frequency shifts.

The process emits a third pair of laser beams from the location on the aircraft (operation 2804). In operation 2804, the third pair of laser beams is emitted at a third pair of focal points that results in a third pair of backscatter lights having third opposite frequency shifts.

The process receives the first pair of backscatter lights; the second pair of backscatter lights, and the third pair of backscatter lights (operation 2806). The process interferes the first pair of backscatter lights with each other to generate a first interfered light with a first beat frequency (operation 2808). The process interferes the second pair of backscatter lights with each other to generate a second interfered light with a second beat frequency (operation 2810). The process interferes the third pair of backscatter lights with each other to generate a third interfered light with a third beat frequency (operation 2812).

The process detects the first beat frequency in the first interfered light, the second beat frequency in the second interfered light, and the third beat frequency in the third interfered light (operation 2814). The process determines a velocity of the aircraft using the first beat frequency, the second beat frequency, and the third beat frequency (operation 2816). The process terminates thereafter.

Figure 29:
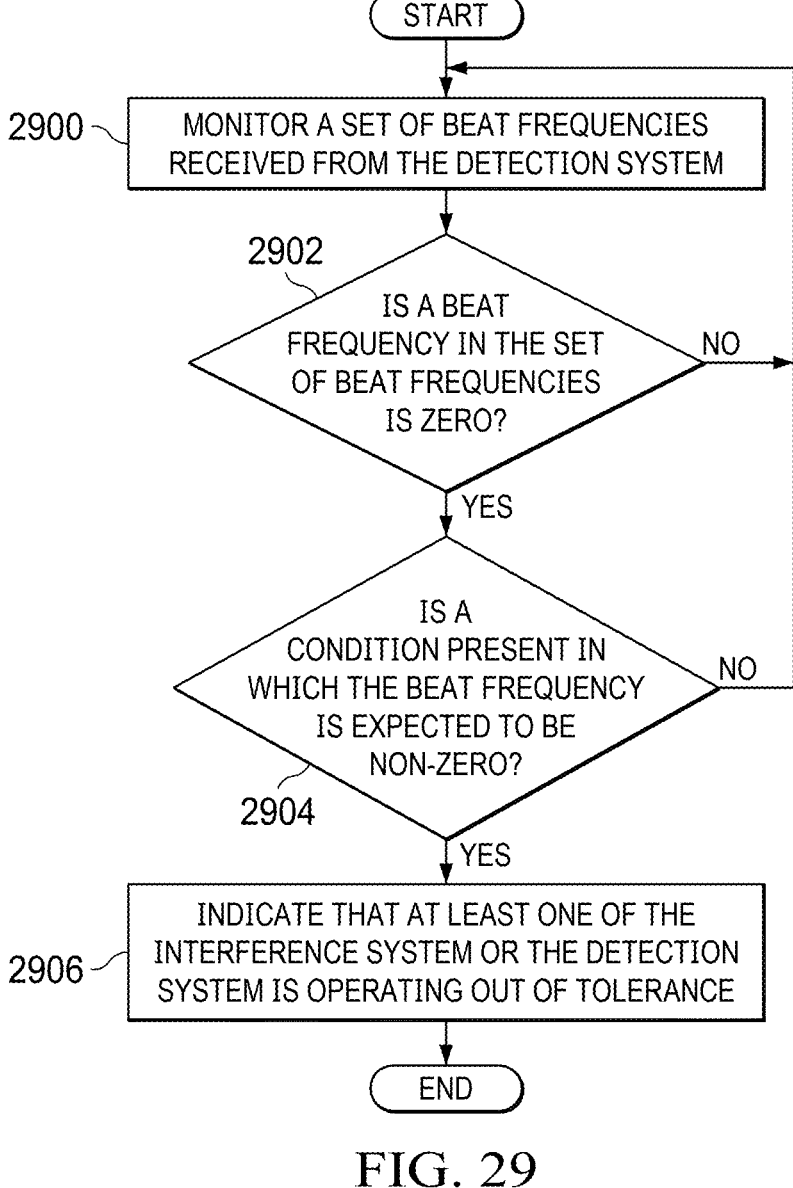
FIG. 29 is an illustration of a flowchart of a process for determining an out of tolerance operation of a set of components in a speed detection system in accordance with an illustrative embodiment.

Turning to FIG. 29, an illustration of a flowchart of a process for determining an out of tolerance operation of a set of components in a speed detection system is depicted in accordance with an illustrative embodiment. The process in FIG. 29 can be implemented in hardware, software, or both. When implemented in software, the process can take the form of program instructions that is run by one of more processor units located in one or more hardware devices in one or more computer systems. For example, the process can be implemented in speed analyzer 212 in speed detection system 204 in FIG. 2 and in speed analyzer 1324 in speed detection system 1300 in FIG. 13.

The process begins by monitoring a set of beat frequencies received from the detection system (operation 2900). The process determines whether a beat frequency in the set of beat frequencies is zero (operation 2902). In response to a beat frequency being non-zero, the process returns to operation 2900.

Otherwise, the process determines whether a condition is present in which the beat frequency is expected to be non-zero (operation 2904). If the condition is not present, the process returns to operation 2900.

If the condition is present in which the beat frequency is expected to be non-zero, the process indicates that at least one of the interference system or the detection system is operating out of tolerance (operation 2906). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figures 30, 31:
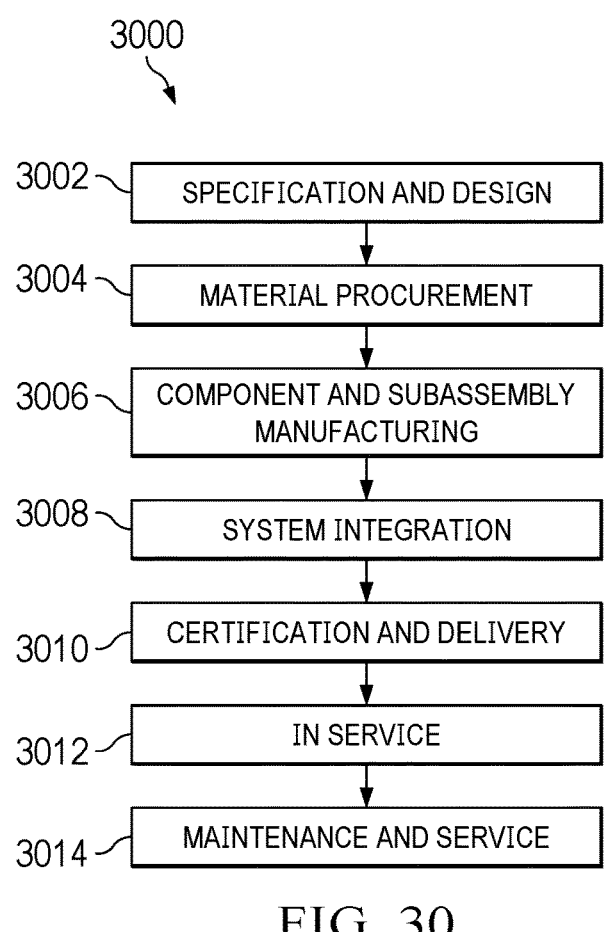
FIG. 30 is an illustration of an aircraft manufacturing and service method in accordance with an illustrative embodiment.
FIG. 31 is an illustration of a block diagram of an aircraft in which an illustrative embodiment may be implemented.

Illustrative embodiments of the disclosure may be described in the context of aircraft manufacturing and service method 3000 as shown in FIG. 30 and aircraft 3100 as shown in FIG. 31. Turning first to FIG. 30, an illustration of an aircraft manufacturing and service method is depicted in accordance with an illustrative embodiment. During pre-production, aircraft manufacturing and service method 3000 may include specification and design 3002 of aircraft 3100 in FIG. 31 and material procurement 3004.

During production, component and subassembly manufacturing 3006 and system integration 3008 of aircraft 3100 in FIG. 31 takes place. Thereafter, aircraft 3100 in FIG. 31 can go through certification and delivery 3010 in order to be placed in service 3012. While in service 3012 by a customer, aircraft 3100 in FIG. 31 is scheduled for routine maintenance and service 3014, which may include modification, reconfiguration, refurbishment, and other maintenance or service.

Each of the processes of aircraft manufacturing and service method 3000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 31, an illustration of an aircraft is depicted in which an illustrative embodiment may be implemented. In this example, aircraft 3100 is produced by aircraft manufacturing and service method 3000 in FIG. 30 and may include airframe 3102 with plurality of systems 3104 and interior 3106. Examples of systems 3104 include one or more of propulsion system 3108, electrical system 3110, hydraulic system 3112, and environmental system 3114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 3000 in FIG. 30.

In one illustrative example, components or subassemblies produced in component and subassembly manufacturing 3006 in FIG. 30 can be fabricated or manufactured in a manner similar to components or subassemblies produced while aircraft 3100 is in service 3012 in FIG. 30. As yet another example, one or more apparatus embodiments, method embodiments, or a combination thereof can be utilized during production stages, such as component and subassembly manufacturing 3006 and system integration 3008 in FIG. 30. One or more apparatus embodiments, method embodiments, or a combination thereof may be utilized while aircraft 3100 is in service 3012, during maintenance and service 3014 in FIG. 30, or both. The use of a number of the different illustrative embodiments may substantially expedite the assembly of aircraft 3100, reduce the cost of aircraft 3100, or both expedite the assembly of aircraft 3100 and reduce the cost of aircraft 3100.

For example, a speed detection system in the illustrative examples can be implemented during system integration 3008. This speed detection system can also be added to aircraft 3100 during maintenance and service 3014. This addition can be made during modification, reconfiguration, refurbishment, and other maintenance or service.

Further, the use of the speed detection system can occur during in service 3012 in a manner that provides increased performance in detecting the speed of aircraft 3100 during flight. The accuracy of detecting speed can occur during various flight elevations including mid-level elevations where lower density of particles can be present as compared to other elevations.

Some features of the illustrative examples are described in the following clauses. These clauses are examples of features and are not intended to limit other illustrative examples.

Clause 1

A method for detecting a speed of a vehicle, the method comprising:

emitting laser beams into an atmosphere from the vehicle, wherein the laser beams are emitted in different directions from the vehicle;

detecting sets of backscatter light generated in response to transmitting the laser beams into the atmosphere from the vehicle, wherein the sets of backscatter light have frequency shifts relative to a frequency of the laser beams;

measuring a set of beat frequencies from interfering the sets of backscatter light with each other; and determining the speed of the vehicle using the set of beat frequencies.

Clause 2

The method according to clause 1 further comprising:

interfering the sets of backscatter light with each other, wherein a set of interfered lights having the set of beat frequencies is generated.

Clause 3

The method according to one of clauses 1 or 2, wherein emitting the laser beams into the atmosphere from the vehicle comprises:

emitting a first laser beam in a first direction, wherein a first backscatter light having a positive frequency shift from a frequency of the first laser beam is generated in response to emitting the first laser beam; and emitting a second laser beam in a second direction, wherein a second backscatter light having negative frequency shift from a frequency of the second laser beam is generated in response to emitting the second laser beam.

Clause 4

The method according to clause 3, wherein the first direction is a movement direction of a movement of the vehicle and the second direction is an opposite direction to the movement direction of the movement of the vehicle.

Clause 5

The method according to one of clauses 1, 2, 3 or 4, wherein emitting the laser beams into the atmosphere from the vehicle comprises:

emitting pairs of the laser beams into the atmosphere, wherein the laser beams in a pair of the laser beams in the pairs of the laser beams are directed at opposite directions relative to a velocity vector for a movement of the vehicle, wherein a pair of backscatter lights is generated in response to the pair of the laser beams in which a first backscatter light in the pair of backscatter lights has a positive frequency shift and a second backscatter light in the pair of backscatter lights has a negative frequency shift.

Clause 6

The method according to one of clauses 1, 2, 3, 4, or 5, wherein emitting the laser beams into the atmosphere from the vehicle comprises:

emitting a first laser beam in the laser beams in a direction of a velocity vector for a movement of the vehicle; and emitting a second laser beam in the laser beams in an opposite direction to the velocity vector for the movement of the vehicle.

Clause 7

The method according to one of clauses 1, 2, 3, 4, 5, or 6, wherein emitting the laser beams into the atmosphere from the vehicle comprises:

emitting a first laser beam from a first location on the vehicle in a first direction at a focal point, wherein a first backscatter light is generated that has a positive frequency shift from a frequency of the first laser beam in response to emitting the first laser beam; and emitting a second laser beam from a second location on the vehicle in a second direction at the focal point, wherein a second backscatter light is generated that has a negative frequency shift from a frequency of the second laser beam in response to emitting the second laser beam.

Clause 8

The method according to one of clauses 1, 2, 3, 4, 5, 6, or 7, wherein emitting the laser beams into the atmosphere from the vehicle comprises:

emitting a first laser beam in a first direction from a location on a side of the vehicle, wherein a first backscatter light has a positive frequency shift from a frequency of the first laser beam; and emitting a second laser beam in a second direction from the location on the side of the vehicle, wherein a second backscatter light has a negative frequency shift from a frequency of the second laser beam.

Clause 9

The method according to one of clauses 1, 2, 3, 4, 5, 6, 7, or 8, wherein emitting the laser beams into the atmosphere from the vehicle comprises:

emitting a first laser beam in a first direction from a first location on a first side of the vehicle, wherein a first backscatter light has a positive frequency shift from a frequency of the first laser beam; and emitting a second laser beam in a second direction from a second location on a second side of the vehicle opposite to the first side, wherein a second backscatter light has a negative frequency shift from a frequency of the second laser beam.

Clause 10

The method according to one of clauses 1, 2, 3, 4, 5, 6, 7, 8, or 9, wherein emitting the laser beams into the atmosphere from the vehicle, wherein the laser beams are emitted in the different directions comprises:

emitting a first laser beam in a first direction at a focal point from a first location on a side of the vehicle, wherein a first backscatter light has a positive frequency shift from a frequency of the first laser beam; and emitting a second laser beam in a second direction at the focal point from a second location of on the side, wherein a second backscatter light has a negative frequency shift from a frequency of the second laser beam.

Clause 11

The method according to one of clauses 2, 3, 4, 5, 6, 7, 8, 9, or 10, wherein interfering the sets of backscatter light with each other comprises:

interfering a first backscatter light with a second backscatter light, wherein the first backscatter light is detected in response to a first laser beam in a first direction and the second backscatter light is detected in response to a second laser beam in a second direction.

Clause 12

The method according to one of clauses 1, 2, 3, 4, 5, 6, 7, 8, 9, 10, or 11, wherein the vehicle is selected from one of one of a mobile platform, an aircraft, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, and an automobile.

Clause 13

A method for detecting a speed of an aircraft, the method comprising:

emitting a first laser beam and a second laser beam in different directions into an atmosphere from the aircraft;

detecting a first backscatter light and a second backscatter light, wherein the first backscatter light having a positive frequency shift is generated in response to emitting the first laser beam and the second backscatter light having a negative frequency shift is generated in response to emitting the second laser beam;

interfering the first backscatter light with the second backscatter light, wherein an interfered light having a beat frequency is generated;

measuring the beat frequency; and determining the speed of the aircraft using the beat frequency.

Clause 14

The method according to clause 13, wherein emitting the first laser beam and the second laser beam into the atmosphere from the aircraft comprises:

emitting the first laser beam in a first direction from a location on a side of the aircraft, wherein the first backscatter light has the positive frequency shift from a frequency of the first laser beam; and emitting the second laser beam in a second direction from the location on the side of the aircraft, wherein the second backscatter light has a negative frequency shift from a frequency of the second laser beam.

Clause 15

The method according to one of clauses 13 or 14, wherein emitting the first laser beam and the second laser beam into the atmosphere from the aircraft comprises:

emitting the first laser beam in a first direction from a first location on a first side of the aircraft, wherein the first backscatter light has the positive frequency shift from a frequency of the first laser beam; and emitting the second laser beam in a second direction from a second location on a second side of the aircraft opposite to the first side, wherein the second backscatter light has the negative frequency shift from a frequency of the second laser beam.

Clause 16

The method according to one of clauses 13, 14, or 15, wherein emitting the first laser beam and the second laser beam into the atmosphere from the aircraft comprises:

emitting the first laser beam in a first direction at a focal point from a first location on a side of the aircraft, wherein the first backscatter light has the positive frequency shift from a frequency of the first laser beam; and emitting the second laser beam in a second direction from a second location on the side of the aircraft at the focal point, wherein the second backscatter light has the negative frequency shift from a frequency of the second laser beam.

Clause 17

A method for detecting a speed of an aircraft, the method comprising:

emitting a first pair of laser beams from a location on the aircraft, wherein the first pair of laser beams is emitted at a first pair of focal points that results in a first pair of backscatter lights having first opposite frequency shifts;

emitting a second pair of laser beams from the location on the aircraft, wherein the second pair of laser beams is emitted at a second pair of focal points that results in a second pair of backscatter lights having second opposite frequency shifts;

emitting a third pair of laser beams from the location on the aircraft, wherein the third pair of laser beams is emitted at a third pair of focal points that results in a third pair of backscatter lights having third opposite frequency shifts;

receiving the first pair of backscatter lights;

the second pair of backscatter lights, and the third pair of backscatter lights;

interfering the first pair of backscatter lights with each other to generate a first interfered light with a first beat frequency;

interfering the second pair of backscatter lights with each other to generate a second interfered light with a second beat frequency;

interfering the third pair of backscatter lights with each other to generate a third interfered light with a third beat frequency;

detecting the first beat frequency in the first interfered light, the second beat frequency in the second interfered light, and the third beat frequency in the third interfered light; and determining a velocity of the aircraft using the first beat frequency, the second beat frequency, and the third beat frequency.

Clause 18

A speed detection system comprising:

a laser beam generator configured to emit laser beams into an atmosphere from a vehicle, wherein the laser beams are emitted in different directions from the vehicle;

an interference system configured to interfere sets of backscatter light with each other, wherein a set of interfered lights having a set of beat frequencies is generated;

a detection system configured to measure the set of beat frequencies in the set of interfered lights; and a speed analyzer configured to determine a speed for the vehicle using the set of beat frequencies.

Clause 19

The speed detection system according to clause 18, wherein in emitting the laser beams into the atmosphere from the vehicle, the laser beam generator is configured to:

emit a first laser beam in a first direction, wherein a first backscatter light having a positive frequency shift from a frequency of the first laser beam is generated in response to emitting the first laser beam; and emit a second laser beam in a second direction, wherein a second backscatter light having a negative frequency shift from a frequency of the second laser beam is generated in response to emitting the second laser beam.

Clause 20

The speed detection system according to clause 19, wherein the first direction is in a direction of a movement of the vehicle and the second direction is an opposite direction to the movement of the vehicle.

Clause 21

The speed detection system according to one of clauses 18, 19, or 20, wherein in emitting the laser beams into the atmosphere from the vehicle, the laser beam generator is configured to:

emit pairs of the laser beams into the atmosphere, wherein the laser beams in a pair of the laser beams in the pairs of the laser beams are directed at opposite directions relative to a velocity vector for a movement of the vehicle, wherein a pair of backscatter lights is generated in response to the pair of the laser beams in which a first backscatter light in the pair of backscatter lights has a positive frequency shift and a second backscatter light in the pair of backscatter lights has a negative frequency shift.

Clause 22

The speed detection system according to one of clauses 18, 19, 20, or 21, wherein in emitting the laser beams into the atmosphere from the vehicle, the laser beam generator is configured to:

emit a first laser beam in the laser beams in a direction of a velocity vector for a movement of the vehicle; and emit a second laser beam in the laser beams in an opposite direction to the velocity vector for the movement of the vehicle.

Clause 23

The speed detection system according to one of clauses 18, 19, 20, 21, or 22, wherein in emitting the laser beams into the atmosphere from the vehicle, the laser beam generator is configured to:

emit a first laser beam from a first location on the vehicle in a first direction at a focal point, wherein a first backscatter light is generated that has a positive frequency shift from a frequency of the first laser beam in response to emitting the first laser beam; and emit a second laser beam from a second location on the vehicle in a second direction at the focal point, wherein a second backscatter light is generated that has a negative frequency shift from a frequency of the second laser beam in response to emitting the second laser beam.

Clause 24

The speed detection system according to one of clauses 18, 19, 20, 21, 22, or 23, wherein in emitting the laser beams into the atmosphere from the vehicle, the laser beam generator is configured to:

emit a first laser beam in a first direction from a location on a side of the vehicle, wherein a first backscatter light has a positive frequency shift from a frequency of the first laser beam; and emit a second laser beam in a second direction from the location on the side of the vehicle, wherein a second backscatter light has a negative frequency shift from a frequency of the second laser beam.

Clause 25

The speed detection system according to one of clauses 18, 19, 20, 21, 22, 23, or 24, wherein in emitting the laser beams into the atmosphere from the vehicle, the laser beam generator is configured to:

emit a first laser beam in a first direction from a first location on a first side of the vehicle, wherein a first backscatter light has a positive frequency shift from a frequency of the first laser beam; and emit a second laser beam in a second direction from a second location on a second side of the vehicle opposite to the first side, wherein a second backscatter light has a negative frequency shift from a frequency of the second laser beam.

Clause 26

The speed detection system according to one of clauses 18, 19, 20, 21, 22, 23, 24, or 25, wherein in emitting the laser beams into the atmosphere from the vehicle, the laser beam generator is configured to:

emit a first laser beam in a first direction at a focal point from a first location on a side of the vehicle, wherein a first backscatter light has a positive frequency shift from a frequency of the first laser beam; and emit a second laser beam in a second direction at the focal point, wherein a second backscatter light has a negative frequency shift from a frequency of the second laser beam.

Clause 27

The speed detection system according to one of clauses 18, 19, 20, 21, 22, 23, 24, 25, or 26, wherein in interfering the sets of backscatter light with each other, the laser beam generator is configured to:

interfere a first backscatter light with a second backscatter light, wherein the first backscatter light is detected in response to a first laser beam in a first direction and the second backscatter light is detected in response to a second laser beam in a second direction.

Clause 28

The speed detection system according to one of clauses 18, 19, 20, 21, 22, 23, 24, 25, 26, or 27, wherein the vehicle is selected from one of one of a mobile platform, an aircraft, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, and an automobile.

Clause 29

A speed detection system comprising:

a laser beam generator configured to emit laser beams into an atmosphere from a vehicle, wherein the laser beams are emitted in different directions from the vehicle;

an interference system configured to interfere sets of backscatter light with each other, wherein a set of interfered lights having a set of beat frequencies is generated;

a detection system configured to measure the set of beat frequencies in the set of interfered lights; and a speed analyzer configured to:

monitor the set of beat frequencies received from the detection system; and indicate that at least one of the interference system or the detection system is operating out of tolerance in response a beat frequency in the set of beat frequencies being zero and in response to a presence of a condition in which the beat frequency is expected to be non-zero.

Clause 30

The speed detection system according to clause 29, wherein the condition is the vehicle is moving and the laser beam generator in the speed detection system is emitting the laser beams.

Clause 31

The speed detection system according to one of clauses 29 or 30, wherein the speed analyzer is configured to determine a speed for the vehicle using the set of beat frequencies.

Thus, illustrative examples provide a method, apparatus, and system for detecting the speed of a vehicle. In one illustrative example, laser beams are emitted into an atmosphere from the vehicle. The laser beams are emitted in different directions from the vehicle. Sets of backscatter light are generated in response to transmitting the laser beams into the atmosphere from the vehicle. The sets of backscatter light have frequency shifts relative to the frequency of the laser beams. A set of beat frequencies from interfering the sets of backscatter light with each other is measured. The speed of the vehicle is determined using the set of beat frequencies.

In these illustrative examples, the emission of laser beams in different directions can result in pairs backscatter light being received that have increased frequency shifts. For example, a pair of laser beams can be emitted such that the first backscatter light received in response to a first laser beam and the second backscatter light received in response to a second laser beam in the pair of laser beams has a greater frequency shift as compared to using backscatter light from a single laser beam. With one laser beam being emitted in a direction of the movement of a vehicle and the other laser beam being emitted in an opposite direction of the movement of the vehicle, the pair of backscatter lights can have an increased frequency shift. The laser beam emitted in the direction of movement of the vehicle results in a positive frequency shift while the laser beam emitted in the opposite direction of movement of the vehicle results in a negative frequency shift. As a result, an increased frequency shift can occur that can be twice of what is detected when backscatter light is detected in response to when the laser beam is interfered with the reference light. In this example, the two backscatter lights from the two laser beams are interfered with each other to obtain an interfered signal for use in detecting speed of the vehicle. The detection of the speed of the vehicle can be more accurately determined with the increased difference in frequency between the backscatter light.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for detecting a speed of a vehicle, the method comprising:
emitting laser beams into an atmosphere from the vehicle, wherein the laser beams are emitted in different directions from the vehicle;

detecting sets of backscatter light generated in response to transmitting the laser beams into the atmosphere from the vehicle, wherein the sets of backscatter light have frequency shifts relative to a frequency of the laser beams;
measuring a set of beat frequencies from interfering the sets of backscatter light with each other;
determining the speed of the vehicle using the set of beat frequencies; and
indicating an out of tolerance condition when a beat frequency in the set of beat frequencies is zero and a condition is present in which the beat frequency is expected to be non-zero.

2. The method of claim 1 further comprising:
interfering the sets of backscatter light with each other, wherein a set of interfered lights having the set of beat frequencies is generated.

3. The method of claim 1, wherein emitting the laser beams into the atmosphere from the vehicle comprises:
emitting a first laser beam in a first direction, wherein a first backscatter light having a positive frequency shift from a frequency of the first laser beam is generated in response to emitting the first laser beam; and
emitting a second laser beam in a second direction, wherein a second backscatter light having negative frequency shift from a frequency of the second laser beam is generated in response to emitting the second laser beam.

4. The method of claim 3, wherein the first direction is a movement direction of a movement of the vehicle and the second direction is an opposite direction to the movement direction of the movement of the vehicle.

5. The method of claim 1, wherein emitting the laser beams into the atmosphere from the vehicle comprises:
emitting pairs of the laser beams into the atmosphere, wherein the laser beams in a pair of the laser beams in the pairs of the laser beams are directed at opposite directions relative to a velocity vector for a movement of the vehicle, wherein a pair of backscatter lights is generated in response to the pair of the laser beams in which a first backscatter light in the pair of backscatter lights has a positive frequency shift and a second backscatter light in the pair of backscatter lights has a negative frequency shift.

6. The method of claim 1, wherein emitting the laser beams into the atmosphere from the vehicle comprises:
emitting a first laser beam in the laser beams in a direction of a velocity vector for a movement of the vehicle; and
emitting a second laser beam in the laser beams in an opposite direction to the velocity vector for the movement of the vehicle.

7. The method of claim 1, wherein emitting the laser beams into the atmosphere from the vehicle comprises:
emitting a first laser beam from a first location on the vehicle in a first direction at a focal point, wherein a first backscatter light is generated that has a positive frequency shift from a frequency of the first laser beam in response to emitting the first laser beam; and
emitting a second laser beam from a second location on the vehicle in a second direction at the focal point, wherein a second backscatter light is generated that has a negative frequency shift from a frequency of the second laser beam in response to emitting the second laser beam.

8. The method of claim 1, wherein emitting the laser beams into the atmosphere from the vehicle comprises:

emitting a first laser beam in a first direction from a location on a side of the vehicle, wherein a first backscatter light has a positive frequency shift from a frequency of the first laser beam; and emitting a second laser beam in a second direction from the location on the side of the vehicle, wherein a second backscatter light has a negative frequency shift from a frequency of the second laser beam.

9. The method of claim 1, wherein emitting the laser beams into the atmosphere from the vehicle comprises:

emitting a first laser beam in a first direction from a first location on a first side of the vehicle, wherein a first backscatter light has a positive frequency shift from a frequency of the first laser beam; and emitting a second laser beam in a second direction from a second location on a second side of the vehicle opposite to the first side, wherein a second backscatter light has a negative frequency shift from a frequency of the second laser beam.

10. The method of claim 1, wherein emitting the laser beams into the atmosphere from the vehicle, wherein the laser beams are emitted in the different directions comprises:

emitting a first laser beam in a first direction at a focal point from a first location on a side of the vehicle, wherein a first backscatter light has a positive frequency shift from a frequency of the first laser beam; and emitting a second laser beam in a second direction at the focal point from a second location of on the side, wherein a second backscatter light has a negative frequency shift from a frequency of the second laser beam.

11. The method of claim 2, wherein interfering the sets of backscatter light with each other comprises:

interfering a first backscatter light with a second backscatter light, wherein the first backscatter light is detected in response to a first laser beam in a first direction and the second backscatter light is detected in response to a second laser beam in a second direction.

12. The method of claim 1, wherein the vehicle is selected from one of a mobile platform, an aircraft, a commercial airplane, a tilt-rotor aircraft, a tilt wing aircraft, a vertical takeoff and landing aircraft, a electrical vertical takeoff and landing vehicle, a personal air vehicle, a surface ship, a tank, a personnel carrier, a train, a spacecraft, a submarine, a bus, and an automobile.

13. A method for detecting a speed of an aircraft, the method comprising:

emitting a first laser beam and a second laser beam in different directions into an atmosphere from the aircraft;

detecting a first backscatter light and a second backscatter light, wherein the first backscatter light having a positive frequency shift is generated in response to emitting the first laser beam and the second backscatter light having a negative frequency shift is generated in response to emitting the second laser beam;

interfering the first backscatter light with the second backscatter light, wherein an interfered light having a beat frequency is generated;

measuring the beat frequency;

determining the speed of the aircraft using the beat frequency; and indicating an out of tolerance condition when the beat frequency is zero and a condition is present in which the beat frequency is expected to be non-zero.

14. The method of claim 13, wherein emitting the first laser beam and the second laser beam into the atmosphere from the aircraft comprises:

emitting the first laser beam in a first direction from a location on a side of the aircraft, wherein the first backscatter light has the positive frequency shift from a frequency of the first laser beam; and emitting the second laser beam in a second direction from the location on the side of the aircraft, wherein the second backscatter light has a negative frequency shift from a frequency of the second laser beam.

15. The method of claim 13, wherein emitting the first laser beam and the second laser beam into the atmosphere from the aircraft comprises:

emitting the first laser beam in a first direction from a first location on a first side of the aircraft, wherein the first backscatter light has the positive frequency shift from a frequency of the first laser beam; and emitting the second laser beam in a second direction from a second location on a second side of the aircraft opposite to the first side, wherein the second backscatter light has the negative frequency shift from a frequency of the second laser beam.

16. The method of claim 13, wherein emitting the first laser beam and the second laser beam into the atmosphere from the aircraft comprises:

emitting the first laser beam in a first direction at a focal point from a first location on a side of the aircraft, wherein the first backscatter light has the positive frequency shift from a frequency of the first laser beam; and emitting the second laser beam in a second direction from a second location on the side of the aircraft at the focal point, wherein the second backscatter light has the negative frequency shift from a frequency of the second laser beam.

17. A method for detecting a speed of an aircraft, the method comprising:

emitting a first pair of laser beams from a location on the aircraft, wherein the first pair of laser beams is emitted at a first pair of focal points that results in a first pair of backscatter lights having first opposite frequency shifts;

emitting a second pair of laser beams from the location on the aircraft, wherein the second pair of laser beams is emitted at a second pair of focal points that results in a second pair of backscatter lights having second opposite frequency shifts;

emitting a third pair of laser beams from the location on the aircraft, wherein the third pair of laser beams is emitted at a third pair of focal points that results in a third pair of backscatter lights having third opposite frequency shifts;

receiving the first pair of backscatter lights; the second pair of backscatter lights, and the third pair of backscatter lights;

interfering the first pair of backscatter lights with each other to generate a first interfered light with a first beat frequency;

interfering the second pair of backscatter lights with each other to generate a second interfered light with a second beat frequency;

interfering the third pair of backscatter lights with each other to generate a third interfered light with a third beat frequency;

detecting the first beat frequency in the first interfered light, the second beat frequency in the second interfered light, and the third beat frequency in the third interfered light; and determining a velocity of the aircraft using the first beat frequency, the second beat frequency, and the third beat frequency.

18. A speed detection system comprising:

a laser beam generator configured to emit laser beams into an atmosphere from a vehicle, wherein the laser beams are emitted in different directions from the vehicle;

an interference system configured to interfere sets of backscatter light with each other, wherein a set of interfered lights having a set of beat frequencies is generated;

a detection system configured to measure the set of beat frequencies in the set of interfered lights; and a speed analyzer configured to determine a speed for the vehicle using the set of beat frequencies, the speed analyzer configured to:

monitor the set of beat frequencies received from the detection system; and indicate that at least one of the interference system or the detection system is operating out of tolerance in response a beat frequency in the set of beat frequencies being zero and in response to a presence of a condition in which the beat frequency is expected to be non-zero.

19. The speed detection system of claim 18, wherein in emitting the laser beams into the atmosphere from the vehicle, the laser beam generator is configured to:

emit a first laser beam in a first direction, wherein a first backscatter light having a positive frequency shift from a frequency of the first laser beam is generated in response to emitting the first laser beam; and emit a second laser beam in a second direction, wherein a second backscatter light having a negative frequency shift from a frequency of the second laser beam is generated in response to emitting the second laser beam.

20. The speed detection system of claim 19, wherein the first direction is in a direction of a movement of the vehicle and the second direction is an opposite direction to the movement of the vehicle.

21. The speed detection system of claim 18, wherein in emitting the laser beams into the atmosphere from the vehicle, the laser beam generator is configured to:

emit pairs of the laser beams into the atmosphere, wherein the laser beams in a pair of the laser beams in the pairs of the laser beams are directed at opposite directions relative to a velocity vector for a movement of the vehicle, wherein a pair of backscatter lights is generated in response to the pair of the laser beams in which a first backscatter light in the pair of backscatter lights has a positive frequency shift and a second backscatter light in the pair of backscatter lights has a negative frequency shift.

22. The speed detection system of claim 18, wherein in emitting the laser beams into the atmosphere from the vehicle, the laser beam generator is configured to:

emit a first laser beam in the laser beams in a direction of a velocity vector for a movement of the vehicle; and emit a second laser beam in the laser beams in an opposite direction to the velocity vector for the movement of the vehicle.

23. The speed detection system of claim 18, wherein in emitting the laser beams into the atmosphere from the vehicle, the laser beam generator is configured to:

emit a first laser beam from a first location on the vehicle in a first direction at a focal point, wherein a first backscatter light is generated that has a positive frequency shift from a frequency of the first laser beam in response to emitting the first laser beam; and emit a second laser beam from a second location on the vehicle in a second direction at the focal point, wherein a second backscatter light is generated that has a negative frequency shift from a frequency of the second laser beam in response to emitting the second laser beam.

24. The speed detection system of claim 18, wherein in emitting the laser beams into the atmosphere from the vehicle, the laser beam generator is configured to:

emit a first laser beam in a first direction from a location on a side of the vehicle, wherein a first backscatter light has a positive frequency shift from a frequency of the first laser beam; and emit a second laser beam in a second direction from the location on the side of the vehicle, wherein a second backscatter light has a negative frequency shift from a frequency of the second laser beam.

25. The speed detection system of claim 18, wherein in emitting the laser beams into the atmosphere from the vehicle, the laser beam generator is configured to:

emit a first laser beam in a first direction from a first location on a first side of the vehicle, wherein a first backscatter light has a positive frequency shift from a frequency of the first laser beam; and emit a second laser beam in a second direction from a second location on a second side of the vehicle opposite to the first side, wherein a second backscatter light has a negative frequency shift from a frequency of the second laser beam.

26. The speed detection system of claim 18, wherein in emitting the laser beams into the atmosphere from the vehicle, the laser beam generator is configured to:

emit a first laser beam in a first direction at a focal point from a first location on a side of the vehicle, wherein a first backscatter light has a positive frequency shift from a frequency of the first laser beam; and emit a second laser beam in a second direction at the focal point, wherein a second backscatter light has a negative frequency shift from a frequency of the second laser beam.

27. The speed detection system of claim 18, wherein in interfering the sets of backscatter light with each other, the laser beam generator is configured to:

interfere a first backscatter light with a second backscatter light, wherein the first backscatter light is detected in response to a first laser beam in a first direction and the second backscatter light is detected in response to a second laser beam in a second direction.

28. The speed detection system of claim 18, wherein the vehicle is selected from one of a mobile platform, an aircraft, a commercial airplane, a tilt-rotor aircraft, a tilt wing aircraft, a vertical takeoff and landing aircraft, an electrical vertical takeoff and landing vehicle, a personal air vehicle, a surface ship, a tank, a personnel carrier, a train, a spacecraft, a submarine, a bus, and an automobile.

29. A speed detection system comprising:

a laser beam generator configured to emit laser beams into an atmosphere from a vehicle, wherein the laser beams are emitted in different directions from the vehicle;

an interference system configured to interfere sets of backscatter light with each other, wherein a set of interfered lights having a set of beat frequencies is generated;

a detection system configured to measure the set of beat frequencies in the set of interfered lights; and a speed analyzer configured to:

monitor the set of beat frequencies received from the detection system; and indicate that at least one of the interference system or the detection system is operating out of tolerance in response a beat frequency in the set of beat frequencies being zero and in response to a presence of a condition in which the beat frequency is expected to be non-zero.

30. The speed detection system of claim 29, wherein the condition is the vehicle is moving and the laser beam generator in the speed detection system is emitting the laser beams.

31. The speed detection system of claim 29, wherein the speed analyzer is configured to determine a speed for the vehicle using the set of beat frequencies.

\* \* \* \* \*